United States Patent
Yerramalli et al.

(10) Patent No.: US 12,556,904 B2
(45) Date of Patent: Feb. 17, 2026

(54) WAVEFORM CAPABILITY INDICATION

(71) Applicant: QUALCOMM Incorporated, San Diego, CA (US)

(72) Inventors: Srinivas Yerramalli, San Diego, CA (US); Xiaoxia Zhang, San Diego, CA (US); Tao Luo, San Diego, CA (US); Olufunmilola Omolade Awoniyi-Oteri, San Diego, CA (US); Arumugam Chendamarai Kannan, San Diego, CA (US); Sungwoo Park, San Diego, CA (US); Vinay Chande, San Diego, CA (US); Jing Sun, San Diego, CA (US); Zhifei Fan, San Diego, CA (US)

(*) Notice: Subject to any disclaimer, the term of this patent is extended or adjusted under 35 U.S.C. 154(b) by 0 days.

(21) Appl. No.: 16/890,652

(22) Filed: Jun. 2, 2020

(65) Prior Publication Data

US 2020/0389786 A1    Dec. 10, 2020

Related U.S. Application Data

(60) Provisional application No. 62/858,684, filed on Jun. 7, 2019.

(51) Int. Cl.
*H04B 1/707* (2011.01)
*H04L 5/00* (2006.01)
(Continued)

(52) U.S. Cl.
CPC ........ *H04W 8/22* (2013.01); *H04W 56/0015* (2013.01); *H04W 74/0833* (2013.01)

(58) Field of Classification Search
CPC ............. H04L 5/0007; H04L 27/2636; H04L 27/2646; H04L 27/2666; H04W 56/001;
(Continued)

(56) References Cited

U.S. PATENT DOCUMENTS

2010/0034152 A1    2/2010  Imamura
2016/0105860 A1*   4/2016  Li .................. H04W 72/20
                                                          370/350
(Continued)

FOREIGN PATENT DOCUMENTS

WO    2010030941 A2    3/2010
WO    2018037599 A1    3/2018
(Continued)

OTHER PUBLICATIONS

Guangdong OPPO Mobile Telecom: "Waveform Selection for Uplink Control Signal", 3GPP Draft; R1-1611705, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 14, 2016-Nov. 18, 2016, Nov. 13, 2016 (Nov. 13, 2016), XP051175675, 5 pages, Retrieved from the Internet: URL: http://www.3gpp.org/ftp/Meetings_3GPP_SYNC/RAN1/ Docs [retrieved on Nov. 13, 2016].
(Continued)

*Primary Examiner* — Marcus Smith
*Assistant Examiner* — Jason A Harley

(57) ABSTRACT

Various aspects of the present disclosure generally relate to wireless communication. In some aspects, a user equipment (UE) may receive an indication of one or more waveforms supported by a base station, wherein the one or more waveforms include at least one of an orthogonal frequency division multiplexing (OFDM) waveform, a single carrier frequency domain (SC-FD) waveform, or a single carrier time domain (SC-TD) waveform. The UE may determine whether the UE is capable of communicating with the base station based at least in part on the indication. The UE may selectively communicate with the base station using at least one waveform of the one or more waveforms based at least
(Continued)

in part on the determination. Numerous other aspects are provided.

30 Claims, 12 Drawing Sheets

(51) Int. Cl.
| | |
|---|---|
| *H04L 27/26* | (2006.01) |
| *H04W 8/22* | (2009.01) |
| *H04W 56/00* | (2009.01) |
| *H04W 72/04* | (2023.01) |
| *H04W 72/044* | (2023.01) |
| *H04W 74/0833* | (2024.01) |

(58) Field of Classification Search
CPC ........... H04W 72/042; H04W 72/0453; H04W 92/18; H04W 72/1268; H04B 7/0695; H04B 7/0413; H04B 7/0619
USPC ........................................................ 370/350
See application file for complete search history.

(56) References Cited

U.S. PATENT DOCUMENTS

| | | | |
|---|---|---|---|
| 2017/0099120 A1* | 4/2017 | Damnjanovic | H04L 1/1822 |
| 2017/0374558 A1* | 12/2017 | Zhao | H04W 16/14 |
| 2018/0035423 A1* | 2/2018 | Wang | H04L 5/0007 |
| 2018/0092086 A1* | 3/2018 | Nammi | H04L 27/26025 |
| 2018/0092095 A1* | 3/2018 | Zeng | H04L 5/0007 |
| 2018/0116000 A1* | 4/2018 | Ly | H04W 74/006 |
| 2018/0124790 A1* | 5/2018 | Yerramalli | H04W 72/0453 |
| 2018/0131434 A1* | 5/2018 | Islam | H04B 7/086 |
| 2018/0139785 A1* | 5/2018 | Zhang | H04W 74/0833 |
| 2018/0145854 A1* | 5/2018 | Akkarakaran | H04L 27/2636 |
| 2018/0279292 A1* | 9/2018 | Luo | H04L 1/0028 |
| 2018/0324715 A1* | 11/2018 | Ryoo | H04L 5/0053 |
| 2019/0081770 A1* | 3/2019 | Zhao | H04L 27/2646 |
| 2019/0081838 A1* | 3/2019 | Qu | H04L 27/2614 |
| 2019/0222340 A1* | 7/2019 | Kaikkonen | H04J 11/0073 |
| 2019/0253298 A1* | 8/2019 | Moroga | H04L 5/0044 |
| 2019/0260498 A1* | 8/2019 | Moroga | H04W 72/20 |
| 2020/0100186 A1* | 3/2020 | Osawa | H04W 52/367 |
| 2020/0236699 A1* | 7/2020 | Nakashima | H04W 72/23 |
| 2020/0295896 A1* | 9/2020 | Xiong | H04L 27/2613 |
| 2020/0374960 A1* | 11/2020 | Deenoo | H04B 7/0695 |
| 2021/0297204 A1* | 9/2021 | Davydov | H04W 72/1273 |

FOREIGN PATENT DOCUMENTS

| | | |
|---|---|---|
| WO | 2018057431 A1 | 3/2018 |
| WO | 2018080758 | 5/2018 |
| WO | 2018182927 A1 | 10/2018 |

OTHER PUBLICATIONS

International Search Report and Written Opinion—PCT/US2020/035895—ISA/EPO—Sep. 23, 2020.

* cited by examiner

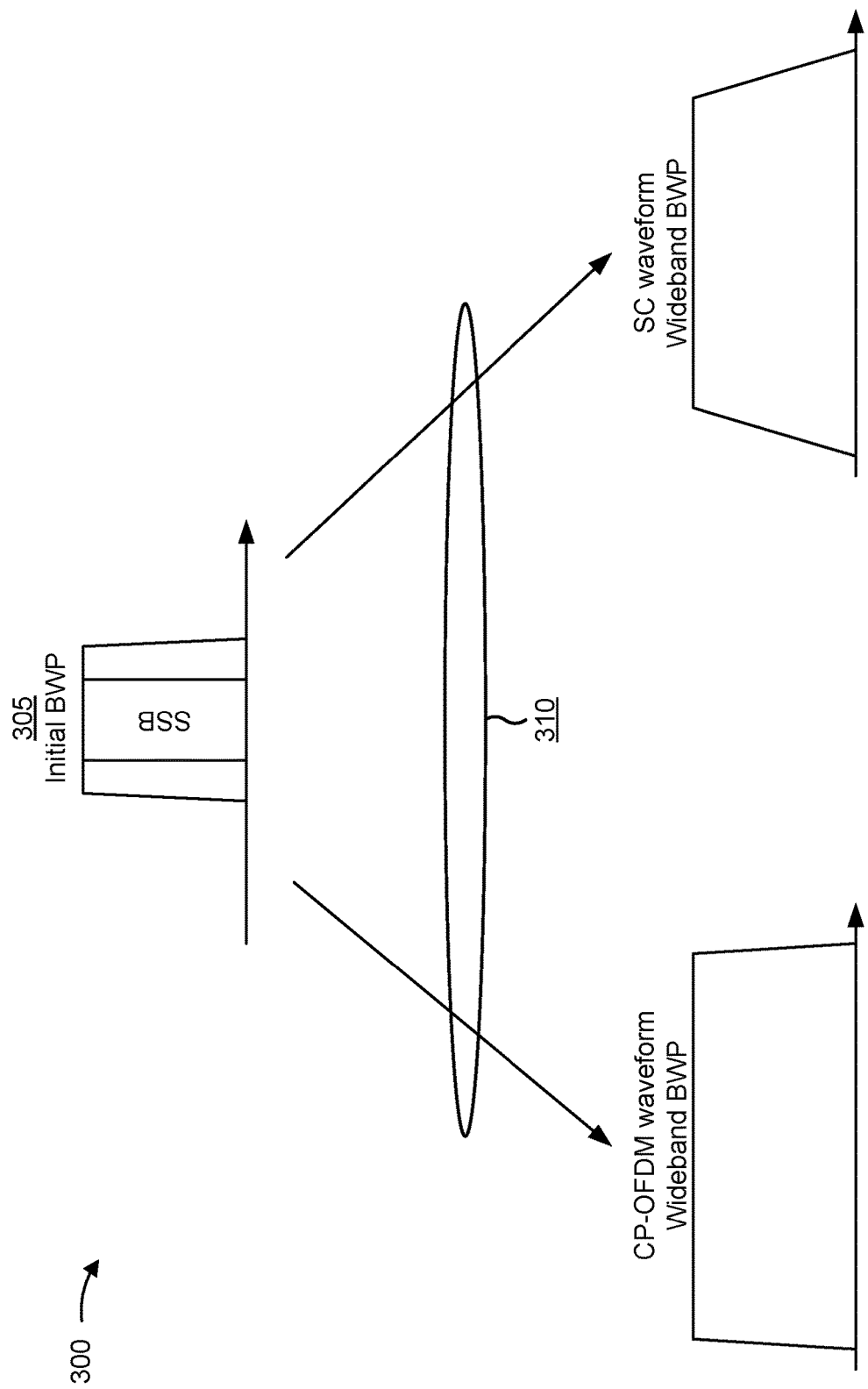

| BS \ UE | Init OFDM TX + SC TD TX/RX 425 | [Init OFDM + SC TD] TX/RX 430 | [Init OFDM + SC TD & FD] TX/RX 435 | [Full OFDM + SC TD & FD] TX/RX 440 |
|---|---|---|---|---|
| Init OFDM RX + SC TD TX/RX 405 | Default/Min Capability: 1. RMSI on SC TD (or) Init-OFDM 2. RACH/RRC on SC TD 445 | Default/Min Capability 445 | Default/Min Capability 445 | Default/Min Capability 445 |
| [Init OFDM + SC TD] TX/RX 410 | Default/Min Capability 445 | Default/Min Capability + RACH/RRC on Init-OFDM 450 | Default/Min Capability + RACH/RRC on Init-OFDM + RMSI on SC FD 460 | Default/Min Capability + RACH/RRC on Init-OFDM + RMSI on SC FD 460 |
| [Init OFDM + SC TD & FD] TX/RX 415 | Default/Min Capability 445 | Default/Min Capability + RACH/RRC on Init-OFDM + RACH/RRC on SC FD 455 | Default/Min Capability + RACH/RRC on Init-OFDM + RMSI on SC FD + RACH/RRC on SC FD 465 | Default/Min Capability + RACH/RRC on Init-OFDM + RMSI on SC FD + RACH/RRC on SC FD 465 |
| [Full OFDM + SC TD & FD] TX/RX 420 | Default/Min Capability 445 | Default/Min Capability + RACH/RRC on Init-OFDM + RACH/RRC on SC FD 455 | Default/Min Capability + RACH/RRC on Init-OFDM + RMSI on SC FD + RACH/RRC on SC FD 465 | Any combination OK 470 |

FIG. 4

WAVEFORM CAPABILITY INDICATION

CROSS-REFERENCE TO RELATED APPLICATION

This Patent Application claims priority to U.S. Provisional Patent Application No. 62/858,684, filed on Jun. 7, 2019, entitled "WAVEFORM CAPABILITY INDICATION," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for waveform capability indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an indication of one or more waveforms supported by a base station, wherein the one or more waveforms include at least one of an orthogonal frequency division multiplexing (OFDM) waveform, a single carrier frequency domain (SC-FD) waveform, or a single carrier time domain (SC-TD) waveform; determining whether the UE is capable of communicating with the base station based at least in part on the indication; and selectively communicating with the base station using at least one waveform of the one or more waveforms based at least in part on the determination.

In some aspects, a method of wireless communication, performed by a base station, may include transmitting an indication of one or more waveforms supported by the base station, wherein the one or more waveforms include at least one of an OFDM waveform, an SC-FD waveform, or an SC-TD waveform; and communicating with a UE using at least one waveform of the one or more waveforms.

In some aspects, a UE for wireless communication may include memory and one or more processors operatively coupled to the memory. The memory and the one or more processors may be configured to receive an indication of one or more waveforms supported by a base station, wherein the one or more waveforms include at least one of an OFDM waveform, an SC-FD waveform, or an SC-TD waveform; determine whether the UE is capable of communicating with the base station based at least in part on the indication; and selectively communicate with the base station using at least one waveform of the one or more waveforms based at least in part on the determination.

In some aspects, a base station for wireless communication may include memory and one or more processors operatively coupled to the memory. The memory and the one or more processors may be configured to transmit an indication of one or more waveforms supported by the base station, wherein the one or more waveforms include at least one of an OFDM waveform, an SC-FD waveform, or an SC-TD waveform; and communicate with a UE using at least one waveform of the one or more waveforms.

In some aspects, a non-transitory computer-readable medium may store one or more instructions for wireless communication. The one or more instructions, when executed by one or more processors of a UE, may cause the one or more processors to: receive an indication of one or more waveforms supported by a base station, wherein the one or more waveforms include at least one of an OFDM waveform, an SC-FD waveform, or an SC-TD waveform; determine whether the UE is capable of communicating with the base station based at least in part on the indication; and selectively communicate with the base station using at least one waveform of the one or more waveforms based at least in part on the determination.

In some aspects, a non-transitory computer-readable medium may store one or more instructions for wireless communication. The one or more instructions, when executed by one or more processors of a base station, may cause the one or more processors to: transmit an indication of one or more waveforms supported by the base station, wherein the one or more waveforms include at least one of an OFDM waveform, an SC-FD waveform, or an SC-TD waveform; and communicate with a UE using at least one waveform of the one or more waveforms.

In some aspects, an apparatus for wireless communication may include means for receiving an indication of one or more waveforms supported by a base station, wherein the one or more waveforms include at least one of an OFDM waveform, an SC-FD waveform, or an SC-TD waveform; means for determining whether the apparatus is capable of communicating with the base station based at least in part on the indication; and means for selectively communicating with the base station using at least one waveform of the one or more waveforms based at least in part on the determination.

In some aspects, an apparatus for wireless communication may include means for transmitting an indication of one or more waveforms supported by the apparatus, wherein the one or more waveforms include at least one of an OFDM waveform, an SC-FD waveform, or an SC-TD waveform; and means for communicating with a UE using at least one waveform of the one or more waveforms.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of network access using different waveforms, in accordance with various aspects of the present disclosure.

FIG. 4 is a diagram illustrating an example of different UE waveform capabilities and different base station waveform capabilities, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
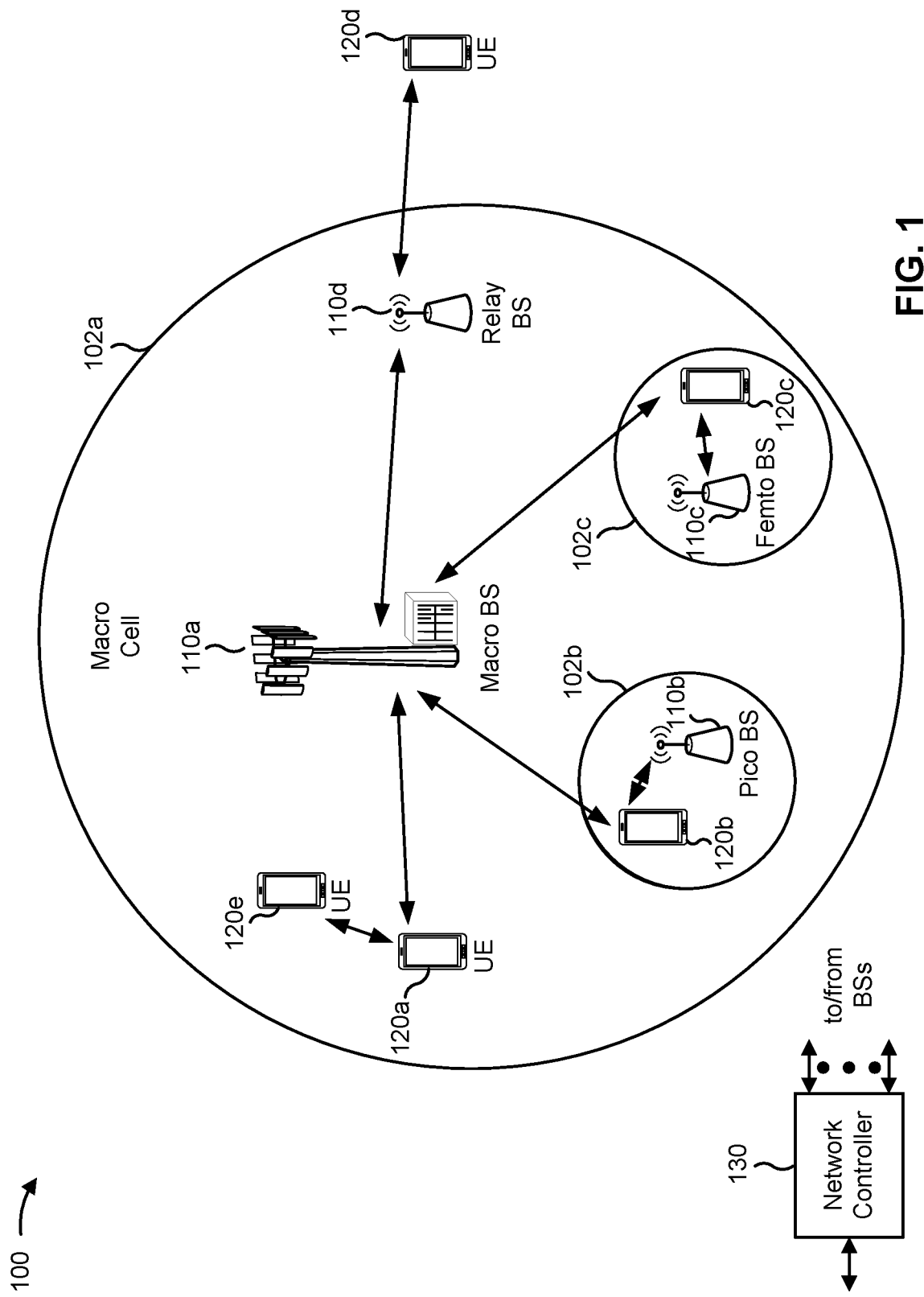
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
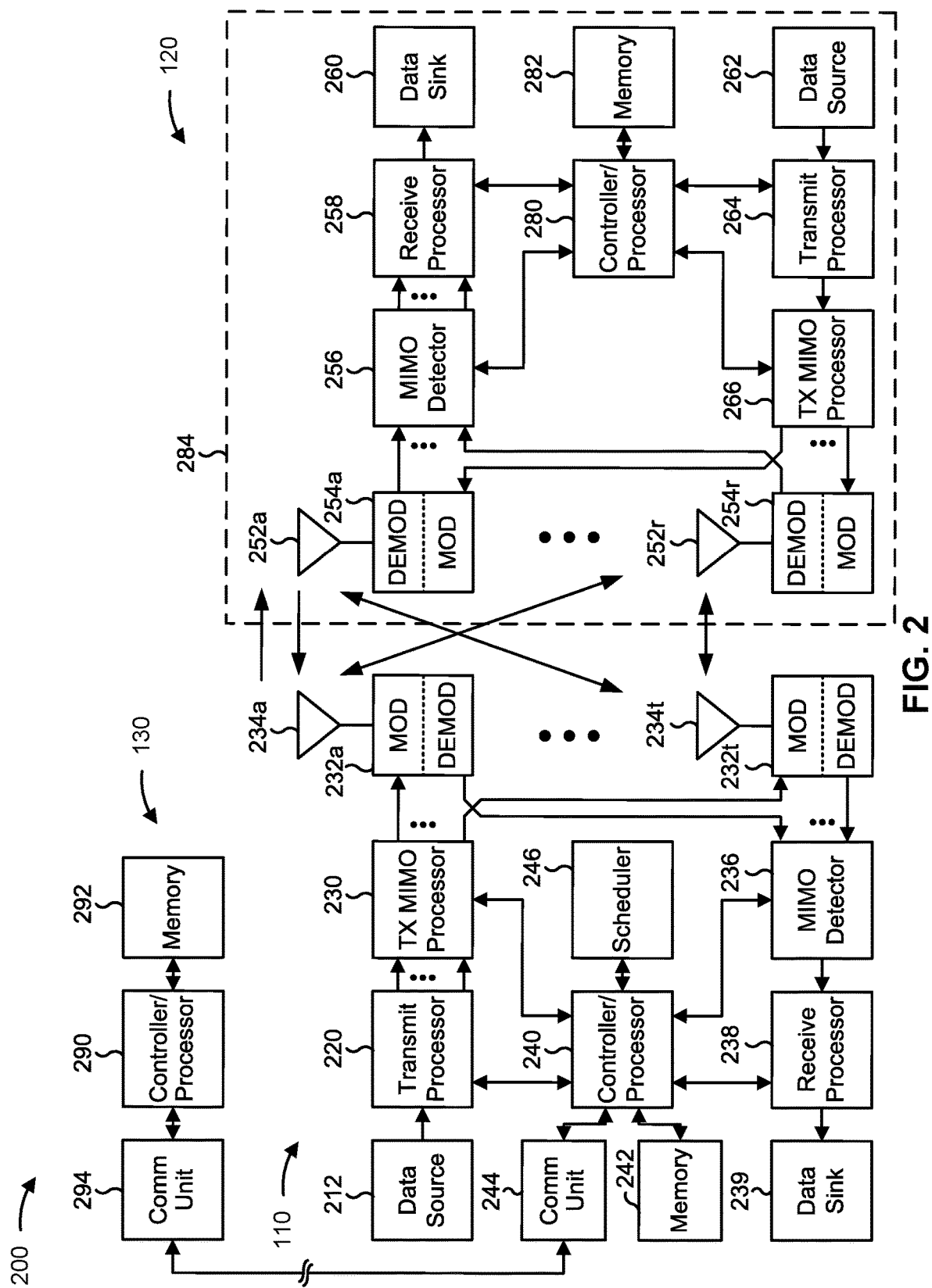
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with waveform capability indication, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving an indication of one or more waveforms supported by a base station, wherein the one or more waveforms include at least one of an orthogonal frequency division multiplexing (OFDM) waveform, a single carrier frequency domain (SC-FD) waveform, or a single carrier time domain (SC-TD) waveform; means for determining whether the UE 120 is capable of communicating with the base station based at least in part on the indication; means for selectively communicating with the base station using at least one waveform of the one or more waveforms based at least in part on the determination; and/or the like. In some aspects, such means may include one or more components of UE 120 described in connection with FIG. 2.

In some aspects, base station 110 may include means for transmitting an indication of one or more waveforms supported by the apparatus, wherein the one or more waveforms include at least one of an OFDM waveform, an SC-FD waveform, or an SC-TD waveform; means for communicating with a UE using at least one waveform of the one or more waveforms; and/or the like. In some aspects, such means may include one or more components of base station 110 described in connection with FIG. 2.

As indicated above, FIG. 2 is provided as an example. Other examples may differ from what is described with regard to FIG. 2.

FIG. 3 is a diagram illustrating an example 300 of network access using different waveforms, in accordance with various aspects of the present disclosure.

As shown by reference number 305, a UE may perform a network access procedure using an initial bandwidth part (BWP), which may be a BWP reserved for or dedicated to initial network access. A base station may transmit synchronization system blocks (SSBs) on the initial BWP, and the UE may measure one or more SSBs. Based at least in part on the measurements, the UE may determine system timing, may identify one or more beams for communicating with the base station, and/or the like. As shown by reference number 310, after obtaining one or more SSBs, a UE and a base station may communicate using a particular waveform, such as a CP-OFDM waveform or a single carrier (SC) waveform.

Some NR frequency bands, such as frequency range 1 (FR1) (e.g., a sub-6 GHz frequency band) and FR2 (e.g., a millimeter wave frequency band that includes frequency bands above, for example, 24 GHz), may operate using an OFDM waveform for downlink communications and may operate using either the OFDM waveform or an SC waveform for uplink communications. The OFDM waveform may use a cyclic prefix (CP), and in such cases may be referred to as a CP-OFDM waveform. The OFDM waveform may provide a relatively high signal-to-noise ratio (SNR), a relatively high spectral efficiency, and/or a relative high order single user and/or multi-user MIMO (e.g., as compared to the SC waveform). The SC waveform may include a discrete Fourier transform spread OFDM (DFT-s-OFDM)). The SC waveform may provide a relatively low peak to average power ratio (PAPR) for better coverage and/or a relatively low complexity for reception and transmission (e.g., as compared to the OFDM waveform). The SC waveform may include, for example, a single carrier time domain (SC-TD) waveform or a single carrier frequency domain (SC-FD) waveform.

NR may include other frequency ranges, such as frequency range 4 (FR4), which may include spectrum between 52 GHz and 115 GHz. For FR4, an SC waveform may be used for downlink communications, unlike for FR1 and for FR2, to improve PAPR and reduce complexity. The SC waveform may include an SC-TD waveform or an SC-FD waveform to achieve different performance tradeoffs. However, permitting multiple different waveforms to be used (e.g., for downlink communications), such as an OFDM waveform, an SC-TD waveform, and/or an SC-FD waveform, may lead to failed communications between a UE and a base station without proper coordination of which waveform is to be used. Furthermore, some waveforms may be supported by some UEs and/or some base stations, and may not be supported by other UEs and/or other base stations. This may lead to incompatibilities between UEs and base stations without proper communication of such capabilities.

Some techniques and apparatus described herein permit a base station and a UE to coordinate the use of a waveform from multiple waveform types, such as OFDM, SC-TD, SC-FD, and/or the like. Such techniques and apparatuses may be applicable to an FR4 spectrum and/or other frequency spectrums.

As indicated above, FIG. 3 is provided as an example. Other examples may differ from what is described with respect to FIG. 3.

FIG. 4 is a diagram illustrating an example 400 of different UE waveform capabilities and different base station waveform capabilities, in accordance with various aspects of the present disclosure.

As shown in FIG. 4, a UE and a base station can have a variety of different waveform capabilities, such as using different types of transmitters and/or receivers (e.g., as described below in connection with FIG. 12). For example, as shown by reference number 405, a UE may have a capability to receive, but not to transmit, communications on an initial BWP using an OFDM waveform (shown as Init OFDM RX), and may have a capability to transmit and receive subsequent communications on a wideband BWP using an SC-TD waveform (shown as SC TD TX/RX) but not using an SC-FD waveform or an OFDM waveform. This capability is shown as Init OFDM RX+SC-TD TX/RX. As shown by reference number 410, a UE may have a capability to transmit and receive communications on an initial BWP using an OFDM waveform, and may have a capability to transmit and receive subsequent communications on a wideband BWP using an SC-TD waveform but not using an SC-FD waveform or an OFDM waveform. This capability is shown as [Init OFDM+SC TD] TX/RX.

As shown by reference number 415, a UE may have a capability to transmit and receive communications on an initial BWP using an OFDM waveform, and may have a capability to transmit and receive subsequent communications on a wideband BWP using an SC-TD waveform and an SC-FD waveform but not using an OFDM waveform. This capability is shown as [Init OFDM+SC TD & FD] TX/RX. As shown by reference number 420, a UE may have a capability to transmit and receive communications on an initial BWP using an OFDM waveform, and may have a capability to transmit and receive subsequent communications on a wideband BWP using an SC-TD waveform, an SC-FD waveform, and an OFDM waveform. This capability is shown as [Full OFDM+SC TD & FD] TX/RX. The UE capabilities shown in FIG. 4 are provided as examples, and other UE capabilities may differ from what is shown.

As shown by reference number 425, a base station (BS) may have a capability to transmit, but not to receive, communications on an initial BWP using an OFDM waveform (shown as Init OFDM TX), and may have a capability to transmit and receive subsequent communications on a wideband BWP using an SC-TD waveform (shown as SC TD TX/RX) but not using an SC-FD waveform or an OFDM waveform. This capability is shown as Init OFDM TX+SC-TD TX/RX. As shown by reference number 430, a base station may have a capability to transmit and receive communications on an initial BWP using an OFDM waveform, and may have a capability to transmit and receive subsequent communications on a wideband BWP using an SC-TD waveform but not using an SC-FD waveform or an OFDM waveform. This capability is shown as [Init OFDM+SC TD] TX/RX.

As shown by reference number 435, a base station may have a capability to transmit and receive communications on an initial BWP using an OFDM waveform, and may have a capability to transmit and receive subsequent communications on a wideband BWP using an SC-TD waveform and an SC-FD waveform but not using an OFDM waveform. This capability is shown as [Init OFDM+SC TD & FD] TX/RX. As shown by reference number 440, a base station may have a capability to transmit and receive communications on an initial BWP using an OFDM waveform, and may have a capability to transmit and receive subsequent communications on a wideband BWP using an SC-TD waveform, an SC-FD waveform, and an OFDM waveform. This capability is shown as [Full OFDM+SC TD & FD] TX/RX. The base station capabilities shown in FIG. 4 are provided as examples, and other base station capabilities may differ from what is shown.

As further shown, in FIG. 4, different combinations of UE capabilities and base station capabilities may permit network procedures (e.g., communication of remaining minimum system information (RMSI), a random access channel (RACH) procedure, a radio resource control (RRC) procedure, and/or the like) to be performed using different types of waveforms. For example, as shown by reference number 445, some combinations of UE and base station waveform capabilities may permit one or more default or minimum capability procedures to be performed, which may include base station transmission and UE reception of RMSI using either an SC-TD waveform on a wideband BWP or an OFDM waveform on an initial BWP (shown as RMSI on SC TD (or) Init-OFDM), and/or which may include performing a RACH procedure and/or an RRC procedure using an SC-TD waveform on a wideband BWP (shown as RACH/RRC on SC TD).

As shown by reference number 450, some combinations of UE and base station waveform capabilities may permit the default or minimum capability procedure(s) to be performed, and may also permit the RACH procedure and/or the RRC procedure to be performed using an OFDM waveform on an initial BWP (shown as +RACH/RRC on Init-OFDM). As shown by reference number 455, some combinations of UE and base station waveform capabilities may permit the default or minimum capability procedure(s) to be performed, may permit the RACH procedure and/or the RRC procedure to be performed using an OFDM waveform on an initial BWP (shown as RACH/RRC on Init-OFDM), and may permit the RACH procedure and/or the RRC procedure to be performed using an SC-FD waveform on a wideband BWP (shown as RACH/RRC on SC FD).

As shown by reference number 460, some combinations of UE and base station waveform capabilities may permit the default or minimum capability procedure(s) to be performed, may permit the RACH procedure and/or the RRC procedure to be performed using an OFDM waveform on an initial BWP (shown as RACH/RRC on Init-OFDM), and may permit communication of RMSI using an SC-FD waveform on a wideband BWP (shown as RMSI on SC FD). As shown by reference number 465, some combinations of UE and base station waveform capabilities may permit the default or minimum capability procedure(s) to be performed, may permit the RACH procedure and/or the RRC procedure to be performed using an OFDM waveform on an initial BWP (shown as RACH/RRC on Init-OFDM), may permit communication of RMSI using an SC-FD waveform on a wideband BWP (shown as RMSI on SC FD), and may permit the RACH procedure and/or the RRC procedure to be performed using an SC-FD waveform on a wideband BWP (shown as RACH/RRC on SC FD).

As shown by reference number 470, some combinations of UE and base station waveform capabilities may permit the default or minimum capability procedure(s) to be performed, may permit the RACH procedure and/or the RRC procedure to be performed using an OFDM waveform on an initial BWP, may permit communication of RMSI using an SC-FD waveform or an OFDM waveform on a wideband BWP, and may permit the RACH procedure and/or the RRC procedure to be performed using an SC-FD waveform or an OFDM waveform on a wideband BWP. In this case, the combination of capabilities may permit communication between the UE and the base station (e.g., for communication of RMSI, for a RACH procedure, for an RRC procedure, and/or the like) using an OFDM waveform on an initial BWP, using an SC-TD waveform on a wideband BWP, using an SC-FD waveform on a wideband BWP, and using an OFDM waveform on a wideband BWP (shown as "Any combination OK").

Permitting multiple different waveforms to be used (e.g., an OFDM waveform, an SC-TD waveform, an SC-FD waveform, and/or the like), depending on a combination of a UE waveform capability and a base station waveform capability, may lead to failed communications between a UE and a base station without proper coordination of which waveform(s) are to be used for different network procedures and/or for communication of different types of information. Some techniques and apparatus described herein permit a base station and a UE to coordinate the use of a waveform from multiple waveform types, such as OFDM, SC-TD, SC-FD, and/or the like. Such techniques and apparatuses may be applicable to an FR4 spectrum and/or other frequency spectrums. In this way, a base station and a UE may be capable of communicating using the same type of waveform.

As indicated above, FIG. 4 is provided as an example. Other examples may differ from what is described with respect to FIG. 4.

Figure 5:
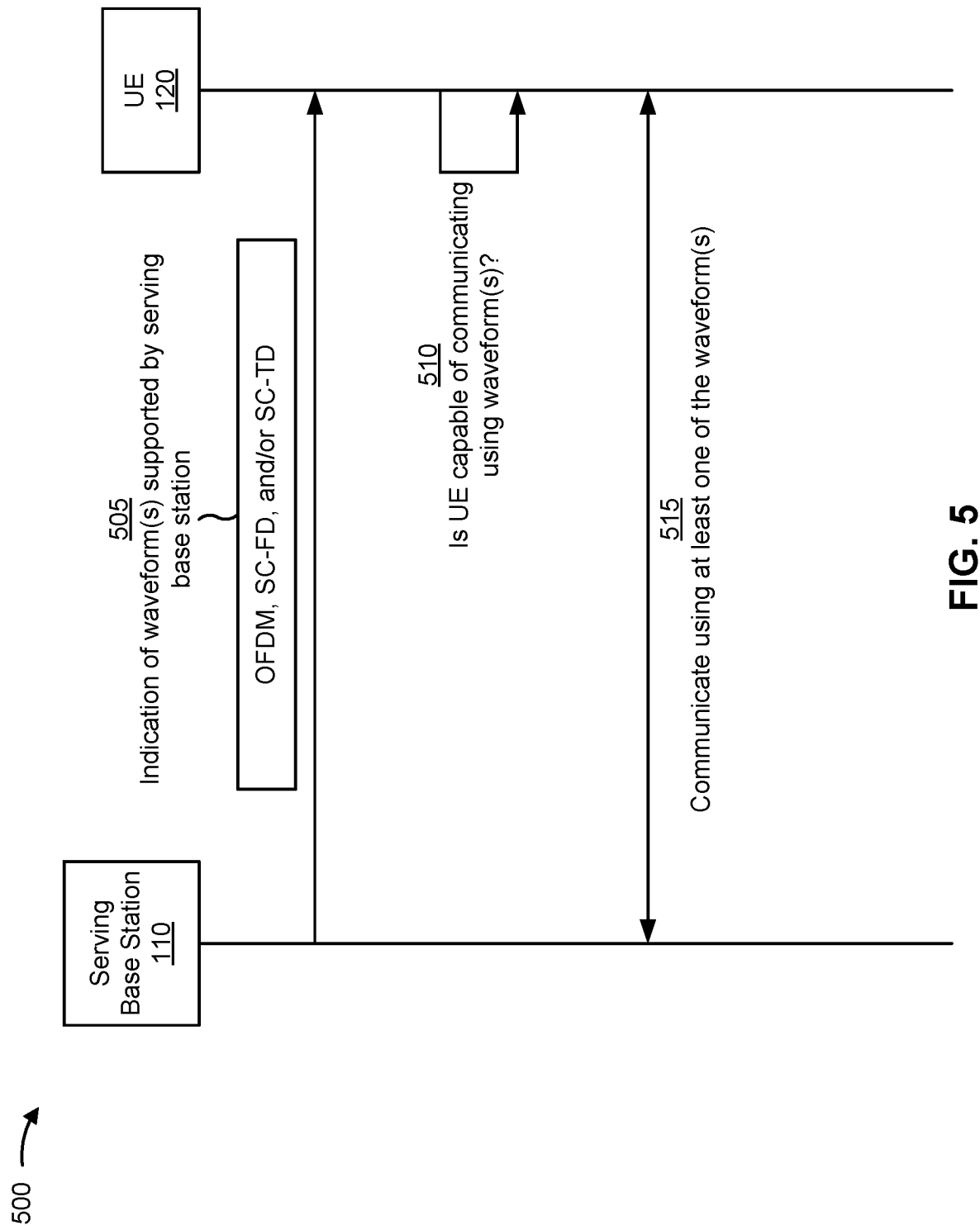
FIGS. 5-9 are diagrams illustrating examples of waveform capability indication, in accordance with various aspects of the present disclosure.

FIG. 5 is a diagram illustrating an example 500 of waveform capability indication, in accordance with various aspects of the present disclosure. As shown in FIG. 5, a base station 110 and a UE 120 may communicate with one another. In some aspects, the base station 110 is a serving base station that serves the UE 120.

As shown by reference number 505, the base station 110 may transmit, and the UE 120 may receive, an indication of one or more waveforms supported by the base station 110. As further shown, the one or more waveforms include an OFDM waveform (e.g., for use on a wideband BWP, since OFDM may always be used on an initial BWP), an SC-FD waveform, and/or an SC-TD waveform. In some aspects, the indication of the waveform(s) supported by the base station 110 may be referred to as a base station waveform capability, a waveform capability of the base station, and/or the like. In some aspects, the indication may further indicate whether the one or more waveforms, supported by the base station 110, are supported for transmission (TX), for reception (RX), or for both transmission and reception. For example, the base station 110 may indicate one or more waveform capabilities described above in connection with FIG. 4 (e.g., in connection with reference numbers 425, 430, 435, and 440).

In some aspects, the base station 110 may use a signaling message to transmit the indication of the base station waveform capability (e.g., using an explicit indication in a field or an information element (IE) in the signaling message). For example, the base station 110 may transmit the indication in a physical broadcast channel (PBCH) communication (e.g., a PBCH payload, an SS/PBCH block, and/or the like), in RMSI, in other system information (OSI), in an RRC message, in a medium access control (MAC) control element (MAC-CE), in downlink control information (DCI), and/or the like. A signaling message used to transmit the indication may dictate the types of communications and/or network procedures for which shared waveform support may be utilized. For example, if the base station waveform capability is indicated in a PBCH communication, then this may permit the UE 120 to determine a waveform to be used to receive RMSI. However, if the base station waveform capability is indicated in the RMSI, then a default waveform may be used to receive RMSI (and the UE 120 may determine a waveform to be used to perform a RACH procedure, an RRC procedure, and/or the like).

Additionally, or alternatively, the base station 110 may scramble and/or modify a signal to indicate the base station waveform capability. For example, the base station 110 may scramble or modify a primary synchronization signal (PSS), a secondary synchronization signal (SSS), a PBCH demodulation reference signal (DMRS), a PBCH cyclic redundancy check (CRC), a reference signal in an SSB, and/or the like. For example, a first scrambling identity or a first set of scrambling identities may indicate a first set of waveforms (e.g., one or more waveforms) supported by the base station 110, and a second scrambling identity or a second set of scrambling identities may indicate a second set of waveforms (e.g., one or more waveforms) supported by the base station 110.

As shown by reference number 510, the UE 120 may determine whether the UE 120 is capable of communicating with the base station 110 based at least in part on the indication. In some aspects, the UE 120 may determine whether the UE 120 and the base station 110 both have a capability to communicate using a same type of waveform, such as by comparing a UE waveform capability to the received base station waveform capability. In some aspects, if at least one waveform in the UE waveform capability matches a waveform in the base station waveform capability, then the UE 120 may determine that the UE 120 and the base station 110 are capable of communicating with one another. In this case, the UE 120 may determine at least one waveform, from one or more matching waveforms, to be used for communications. In some aspects, if none of the waveforms that the UE 120 is capable of using matches a waveform indicated by the base station 110, then the UE 120 may determine that the UE 120 and the base station 110 are not capable of communicating with one another (e.g., on a wideband BWP). In this case, the UE 120 may refrain from performing a network procedure (e.g., obtaining RMSI, performing a RACH procedure, performing an RRC procedure, and/or the like) with the base station 110.

As shown by reference number 515, the UE 120 may selectively communicate with the base station 110 using at least one waveform of the one or more waveforms. For example, if the UE 120 determines that the UE 120 and the base station 110 are capable of communicating with one another, then such communication may occur. Conversely, if the UE 120 determines that the UE 120 and the base station 110 are not capable of communicating with one another, then such communication may not occur. In some aspects, if the UE 120 supports multiple waveforms that are also supported by the base station 110, then the UE 120 may use blind decoding and/or hypothesis detection to attempt to receive or decode communications using one or more of the multiple waveforms.

In some aspects, the base station 110 may transmit a first set of SSBs using the OFDM waveform and may transmit a second set of SSBs using an SC waveform (e.g., one of the SC-FD waveform or the SC-TD waveform). Additionally, or alternatively, the base station 110 may transmit a first set of SSBs using the OFDM waveform, may transmit a second set of SSBs using the SC-TD waveform, and may transmit a third set of SSBs using the SC-FD waveform. In this case, the base station 110 may indicate an SSB transmission pattern (e.g., a set of time resources, frequency resources, spatial resources, and/or the like) for the different sets of SSBs in system information (e.g., for standalone mode) or in an RRC message (e.g., for non-standalone mode). For example, the base station 110 may indicate a first SSB transmission pattern for SSBs transmitted using the OFDM waveform, may indicate a second SSB transmission pattern for SSBs transmitted using the SC-TD waveform, may indicate a third SSB transmission pattern for SSBs transmitted using the SC-FD waveform, and/or the like. In this case, the UE 120 may determine an SSB transmission pattern for a waveform supported by the UE 120 and the base station 110 (and/or a waveform selected by the UE 120 in the case of multiple matching waveforms), and may monitor for SSBs transmitted according to the SSB transmission pattern for that waveform. Alternatively, the UE 120 may process received SSBs using different waveform hypotheses (e.g., using blind decoding and/or the like) to obtain the SSBs.

Additionally, or alternatively, the base station 110 may transmit first RMSI using the OFDM waveform and may transmit second RMSI using an SC waveform (e.g., one of the SC-FD waveform or the SC-TD waveform). In some aspects, the base station 110 may transmit first RMSI using the OFDM waveform, may transmit second RMSI using the SC-TD waveform, and may transmit third RMSI using the SC-FD waveform. In some aspects, the base station 110 may indicate an RMSI transmission pattern (e.g., a set of time resources, frequency resources, spatial resources, and/or the like) for the different RMSI, in a similar manner as described above for SSBs. In this case, the UE 120 may determine an RMSI transmission pattern for a waveform supported by the UE 120 and the base station 110 (and/or a waveform selected by the UE 120 in the case of multiple matching waveforms), and may monitor for RMSI transmitted according to the RMSI transmission pattern for that waveform. Alternatively, the UE 120 may process received RMSI using different waveform hypotheses (e.g., using blind decoding and/or the like) to obtain the RMSI.

In some aspects, the base station 110 may transmit a PBCH payload using a first waveform. The PBCH payload may indicate a location (e.g., a set of time resources, frequency resources, spatial resources, and/or the like) of an SSB and/or of RMSI transmitted using a second, different waveform. For example, the base station 110 may transmit the PBCH payload using an OFDM waveform (e.g., in an initial BWP, in an SS/PBCH block, and/or the like), and the PBCH payload may indicate a location of an SSB (or a set of SSBs) and/or RMSI transmitted using an SC waveform. In some aspects, the PBCH payload may indicate a first location for SSBs and/or RMSI transmitted using an SC-TD waveform and/or a second location for SSBs and/or RMSI transmitted using an SC-FD waveform. The location(s) may be indicated as an absolute location or a relative location (e.g., an offset from the PBCH payload, an offset from an SSB transmitted using the first waveform, and/or the like). In this case, the UE 120 may receive the PBCH payload using the first waveform, and may use the PBCH payload to determine a location for one or more SSBs and/or RMSI transmitted using the second waveform (and to obtain the SSB(s) and/or the RMSI).

In some aspects, the base station 110 may indicate (e.g., using RMSI and/or the like) a first set of RACH resources (e.g., time, frequency, and/or spatial resources) for the OFDM waveform and a second set of RACH resources for an SC waveform (e.g., one of the SC-FD waveform or the SC-TD waveform). Additionally, or alternatively, the base station 110 may indicate a first set of RACH resources for the OFDM waveform, a second set of RACH resources for the SC-TD waveform, and a third set of RACH resources for the SC-FD waveform. In this case, the UE 120 may use the indication to determine a set of RACH resources to be used for a waveform supported by the UE 120 and the base station 110 (and/or a waveform selected by the UE 120 in the case of multiple matching waveforms), and may transmit and/or receive RACH messages using the set of RACH resources for that waveform.

In some aspects, the base station waveform capability may be beam-specific. In this case, the base station 110 may indicate different base station waveform capabilities for different beams and/or different sets of beams. Additionally, or alternatively, when the UE 120 switches beams (e.g., from a first beam that uses a first waveform to a second beam that uses a second waveform), the UE 120 may reset a MAC buffer and/or a radio link control (RLC) buffer because different waveforms may support different payload sizes.

By indicating a base station waveform capability in a communication system (e.g., an NR system on an FR4 band) that permits multiple different waveforms to be used (e.g., an OFDM waveform, an SC-TD waveform, an SC-FD waveform, and/or the like), network performance may be improved. For example, the base station 110 and the UE 120 may coordinate the use of a waveform that is supported by both the base station 110 and the UE 120. Furthermore, different waveforms may be selected in different scenarios, such as for different network loads, different UE battery conditions, and/or the like.

As indicated above, FIG. 5 is provided as an example. Other examples may differ from what is described with respect to FIG. 5.

Figure 6:
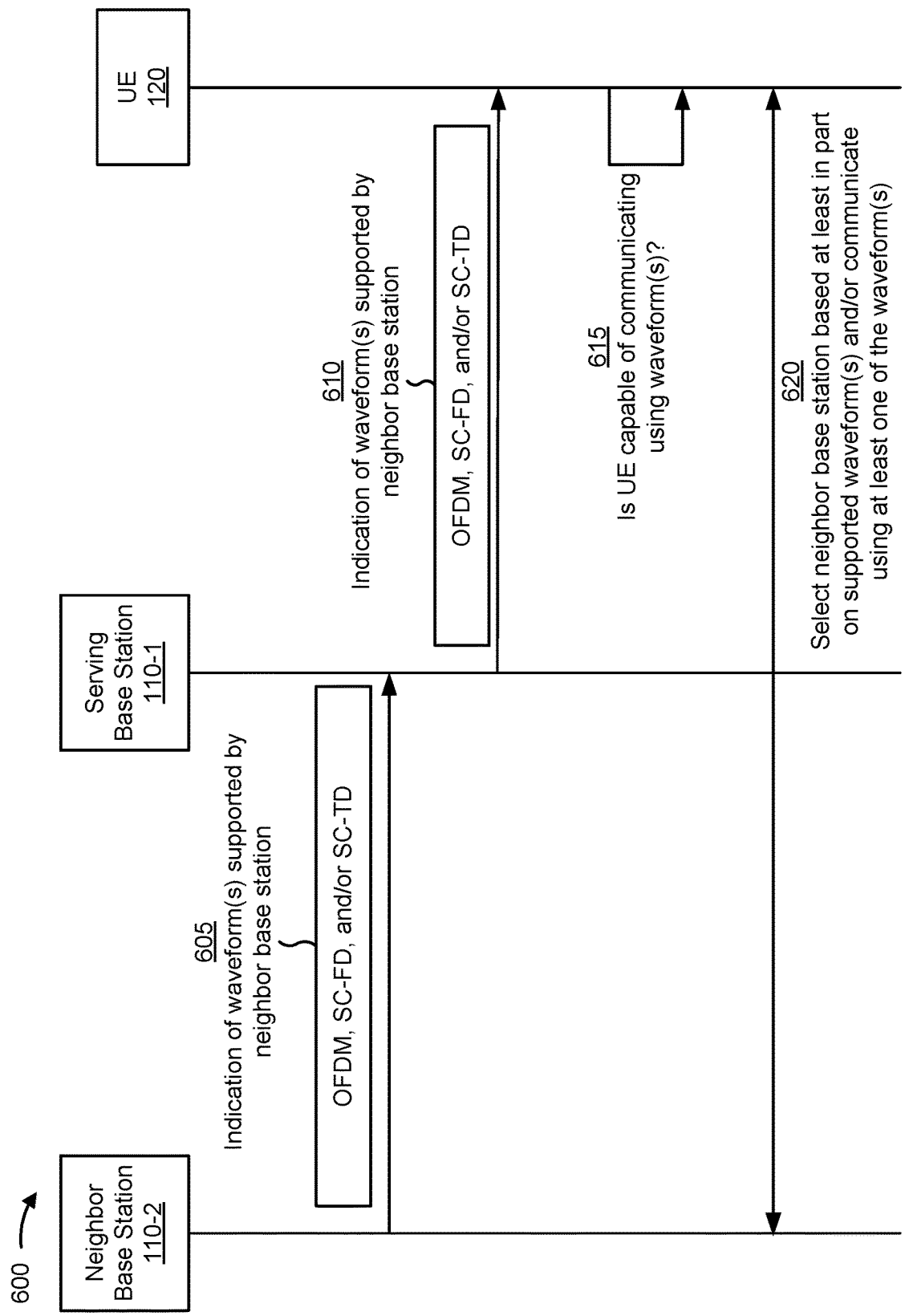

FIG. 6 is a diagram illustrating another example 600 of waveform capability indication, in accordance with various aspects of the present disclosure. As shown in FIG. 6, a serving base station 110-1 and a UE 120 may communicate with one another. In some aspects, the serving base station 110-1 may relay, to the UE 120, a base station waveform capability for a neighbor base station 110-2 (e.g., a neighbor base station waveform capability, as opposed to a serving base station waveform capability described in connection with FIG. 5). In some aspects, the neighbor base station waveform capability may be used for base station (e.g., cell) selection and/or handover.

As shown by reference number 605, the neighbor base station 110-2 may transmit, to the serving base station 110-1, an indication of one or more waveforms supported by the neighbor base station 110-2, in a similar manner as described above in connection with FIG. 5. The one or more waveforms may include an OFDM waveform (e.g., for use on a wideband BWP, since OFDM may always be used on an initial BWP), an SC-FD waveform, and/or an SC-TD waveform. In some aspects, the indication of the waveform(s) supported by the neighbor base station 110-2 may be referred to as a neighbor base station waveform capability, a waveform capability of the neighbor base station, and/or the like. In some aspects, the indication may further indicate whether the one or more waveforms, supported by the neighbor base station 110-2, are supported for transmission (TX), for reception (RX), or for both transmission and reception. For example, the neighbor base station 110-2 may indicate one or more waveform capabilities described above in connection with FIG. 4 (e.g., in connection with reference numbers 425, 430, 435, and 440).

In some aspects, the neighbor base station 110-2 may indicate the one or more waveforms via a wired interface with the serving base station 110-1. Additionally, or alternatively, the neighbor base station 110-2 may indicate the one or more waveforms via a wireless interface with the serving base station 110-1. For example, the neighbor base station 110-2 may use a signaling message to transmit the indication of the neighbor base station waveform capability (e.g., using an explicit indication in a field or an IE in the signaling message), and/or may scramble and/or modify a signal to indicate the neighbor base station waveform capability, in a similar manner as described above in connection with FIG. 5.

As shown by reference number 610, the serving base station 110-1 may transmit, to the UE 120, an indication of the one or more waveforms supported by the neighbor base station 110-2. The indication may be transmitted in a signaling message and/or by scrambling or modifying a signal, as described above.

As shown by reference number 615, the UE 120 may determine whether the UE 120 is capable of communicating with the neighbor base station 110-2 based at least in part on the indication, in a similar manner as described above in connection with FIG. 5. As shown by reference number 620, the UE 120 may selectively communicate with the neighbor base station 110-2 using at least one waveform of the one or more waveforms, in a similar manner as described above in connection with FIG. 5. As further shown, the UE 120 may determine whether to select the neighbor base station 110-2 (e.g., for a handover).

In some aspects, the UE 120 may determine whether to select the neighbor base station 110-2 based at least in part on whether the UE 120 is capable of communicating with the neighbor base station 110-2. For example, the UE 120 may determine whether the UE 120 and the neighbor base station 110-2 both have a capability to communicate using a same type of waveform, such as by comparing a UE waveform capability to the received neighbor base station waveform capability. In some aspects, if at least one waveform in the UE waveform capability matches a waveform in the neighbor base station waveform capability, then the UE 120 may determine that the UE 120 and the neighbor base station 110-2 are capable of communicating with one another. In this case, the UE 120 may determine at least one waveform, from one or more matching waveforms, to be used for communications, and/or the UE 120 may select the neighbor base station 110-2 for a handover (or may include the neighbor base station 110-2 in a list of candidates for selection). In some aspects, if none of the waveforms that the UE 120 is capable of using match a waveform indicated by the neighbor base station 110-2, then the UE 120 may determine that the UE 120 and the neighbor base station 110-2 are not capable of communicating with one another (e.g., on a wideband BWP). In this case, the UE 120 may refrain from performing a network procedure (e.g., cell selection, handover, and/or the like) with the neighbor base station 110-2. For example, the UE 120 may refrain from selecting the neighbor base station 110-2 and/or may exclude the neighbor base station 110-2 from a list of candidates for cell selection.

Additionally, or alternatively, the UE 120 may select a neighbor base station, from a set of candidate neighbor base stations, based at least in part on comparing neighbor base station waveform capabilities of the set of neighbor base stations. For example, if a first neighbor base station supports a higher waveform capability (e.g., an OFDM waveform on a wideband BWP) than a second neighbor base station, then the UE 120 may select and/or prioritize the first neighbor base station. Additionally, or alternatively, the UE 120 may select and/or prioritize a first neighbor base station that supports a greater number of waveforms that are also supported by the UE 120 as compared to a second neighbor base station that supports a smaller number of waveforms that are also supported by the UE 120. In this way, cell selection may be improved by ensuring that a UE 120 selects a neighbor base station 110-2 that is compatible with the UE 120 with respect to supported waveform(s).

As indicated above, FIG. 6 is provided as an example. Other examples may differ from what is described with respect to FIG. 6.

Figure 7:
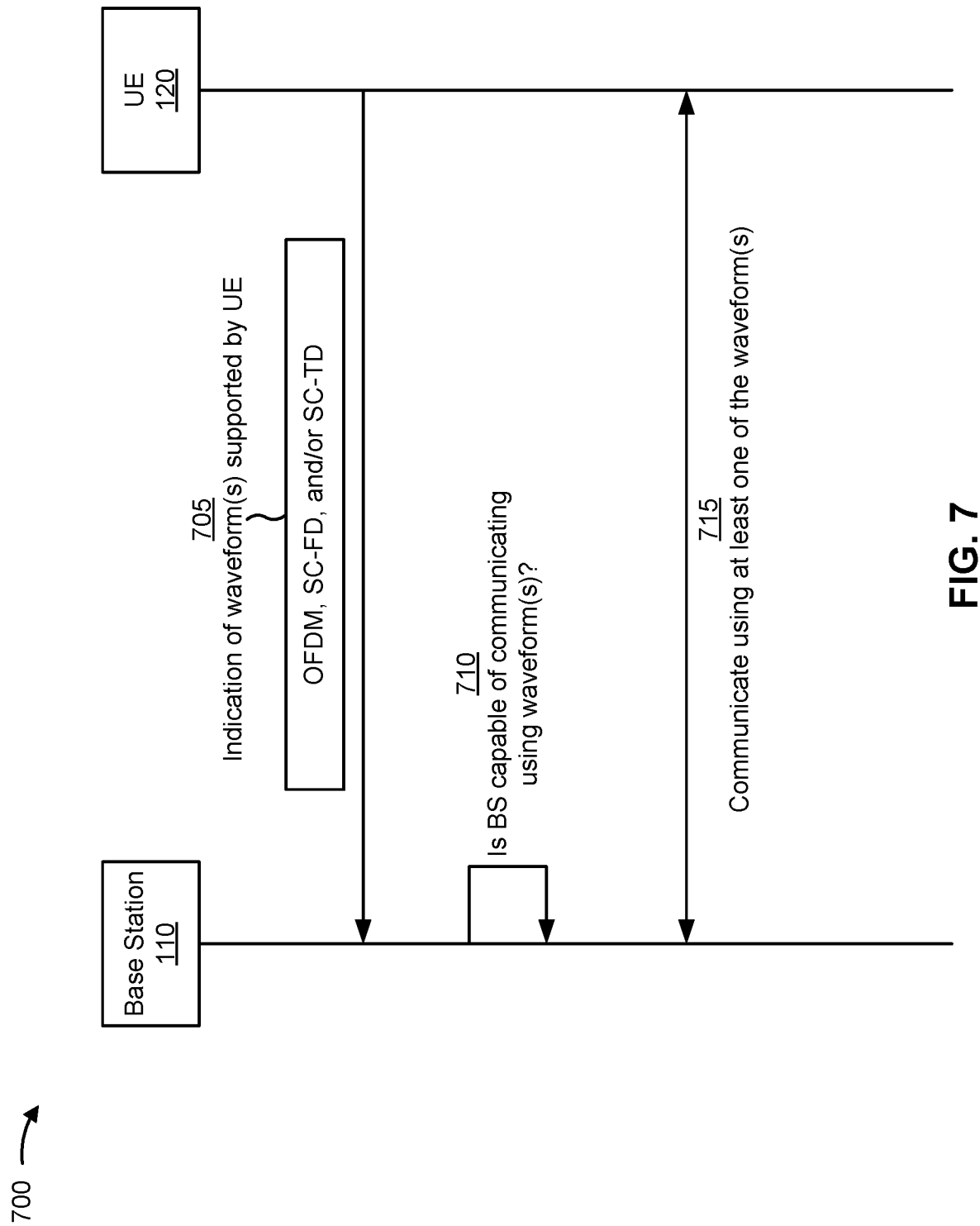

FIG. 7 is a diagram illustrating another example 700 of waveform capability indication, in accordance with various aspects of the present disclosure. As shown in FIG. 7, a base station 110 and a UE 120 may communicate with one another. In some aspects, the base station 110 is a serving base station that serves the UE 120.

As shown by reference number 705, the UE 120 may transmit, and the base station 110 may receive, an indication of one or more waveforms supported by the UE 120. As further shown, the one or more waveforms include an OFDM waveform (e.g., for use on a wideband BWP, since OFDM may always be used on an initial BWP), an SC-FD waveform, and/or an SC-TD waveform. In some aspects, the indication of the waveform(s) supported by the UE 120 may be referred to as a UE waveform capability, a waveform capability of the UE, and/or the like. In some aspects, the indication may further indicate whether the one or more waveforms, supported by the UE 120, are supported for transmission (TX), for reception (RX), or for both transmission and reception. For example, the UE 120 may indicate one or more waveform capabilities described above in connection with FIG. 4 (e.g., in connection with reference numbers 425, 430, 435, and 440).

In some aspects, the UE 120 may transmit the UE waveform capability in a UE capability report. For example, the UE 120 may transmit the UE waveform capability in a UE capability information message associated with initial network registration, in a UE capability report associated with an RRC procedure, and/or the like. In some aspects, when a UE 120 powers on and registers with a network (e.g., a core network, such as via an access and mobility function (AMF) device), the network may enquire about one or more UE capabilities. In this case, the UE 120 may receive a UE capability enquiry from the AMF device (via the base station 110), and may indicate the UE waveform capability to the AMF device (via the base station 110) in a response to the UE capability enquiry (e.g., in a UE capability information message). In some aspects, the AMF device may transmit a message to the base station 110 to notify the base station 110 of the UE waveform capability.

Additionally, or alternatively, the UE 120 may transmit the UE waveform capability to the base station 110 in an RRC message. For example, the UE 120 may indicate the UE waveform capability in a UE capability report transmitted in association with an RRC connection setup procedure. In this case, the base station 110 may request the UE capability report, and the UE 120 may transmit the UE capability report, which may include the UE waveform capability. In some aspects, this technique may be used to report the UE waveform capability when the UE 120 is in an RRC connected mode and/or in association with performing an RRC procedure to enter the RRC connected mode. In some aspects, this technique may be used based at least in part on a determination that the UE capability enquiry described above was not performed as part of initial network access.

Additionally, or alternatively, the UE 120 may indicate the UE waveform capability using a RACH message. For example, the base station 110 may indicate (e.g., using RMSI and/or the like) a first set of RACH resources (e.g., time, frequency, and/or spatial resources) for a first waveform (e.g., the OFDM waveform) and a second set of RACH resources for a second waveform (e.g., an SC waveform, such as one of the SC-FD waveform or the SC-TD waveform). Additionally, or alternatively, the base station 110 may indicate a first set of RACH resources for the OFDM waveform, a second set of RACH resources for the SC-TD waveform, and a third set of RACH resources for the SC-FD waveform. In this case, the UE 120 may use the indication to determine a set of RACH resources to be used for a waveform supported by the UE 120 and the base station 110 (and/or a waveform selected by the UE 120 in the case of multiple matching waveforms), and may transmit a RACH message using the set of RACH resources for that waveform. In this case, the base station 110 may determine a waveform to be used to communicate with the UE 120 based at least in part on the set of RACH resources via which a RACH message is received from the UE 120 and a waveform corresponding to that set of RACH resources, as indicated by the base station 110 to the UE 120. Additionally, or alternatively, the UE 120 may explicitly indicate the UE waveform capability in a RACH message, such as RACH Msg A (e.g., in a RACH payload), RACH Msg 3, and/or another RACH message transmitted by the UE 120 to the base station 110.

As shown by reference number 710, the base station 110 may determine whether the base station 110 is capable of communicating with the UE 120 based at least in part on the indication. In some aspects, the base station 110 may determine whether the UE 120 and the base station 110 both have a capability to communicate using a same type of waveform, such as by comparing a base station waveform capability to the received UE waveform capability. In some aspects, if at least one waveform in the base station waveform capability matches a waveform in the UE waveform capability, then the base station 110 may determine that the UE 120 and the base station 110 are capable of communicating with one another. In this case, the base station 110 may determine at least one waveform, from one or more matching waveforms, to be used for communications. In some aspects, if none of the waveforms that the base station 110 is capable of using matches a waveform indicated by the UE 120, then the base station 110 may determine that the UE 120 and the base station 110 are not capable of communicating with one another (e.g., on a wideband BWP). In this case, the base station 110 may refrain from performing a network procedure (e.g., transmitting RMSI, performing a RACH procedure, performing an RRC procedure, and/or the like) with the UE 120. In some aspects, the base station 110 may reject an access request from the UE 120 based at least in part on determining that the UE 120 and the base station 110 are not capable of communicating with one another (e.g., on a wideband BWP).

As shown by reference number 715, the base station 110 may selectively communicate with the UE 120 using at least one waveform of the one or more waveforms. For example, if the base station 110 determines that the UE 120 and the base station 110 are capable of communicating with one another, then such communication may occur. Conversely, if the base station 110 determines that the UE 120 and the base station 110 are not capable of communicating with one another, then such communication may not occur. In some aspects, if the base station 110 supports multiple waveforms that are also supported by the UE 120, then the base station 110 may use blind decoding and/or hypothesis detection to attempt to receive or decode communications using one or more of the multiple waveforms.

By indicating a UE waveform capability in a communication system (e.g., an NR system on an FR4 band) that permits multiple different waveforms to be used (e.g., an OFDM waveform, an SC-TD waveform, an SC-FD waveform, and/or the like), network performance may be improved. For example, the base station 110 and the UE 120 may coordinate the use of a waveform that is supported by both the base station 110 and the UE 120. Furthermore, different waveforms may be selected in different scenarios, such as for different network loads, different UE battery conditions, and/or the like.

As indicated above, FIG. 7 is provided as an example. Other examples may differ from what is described with respect to FIG. 7.

Figure 8:
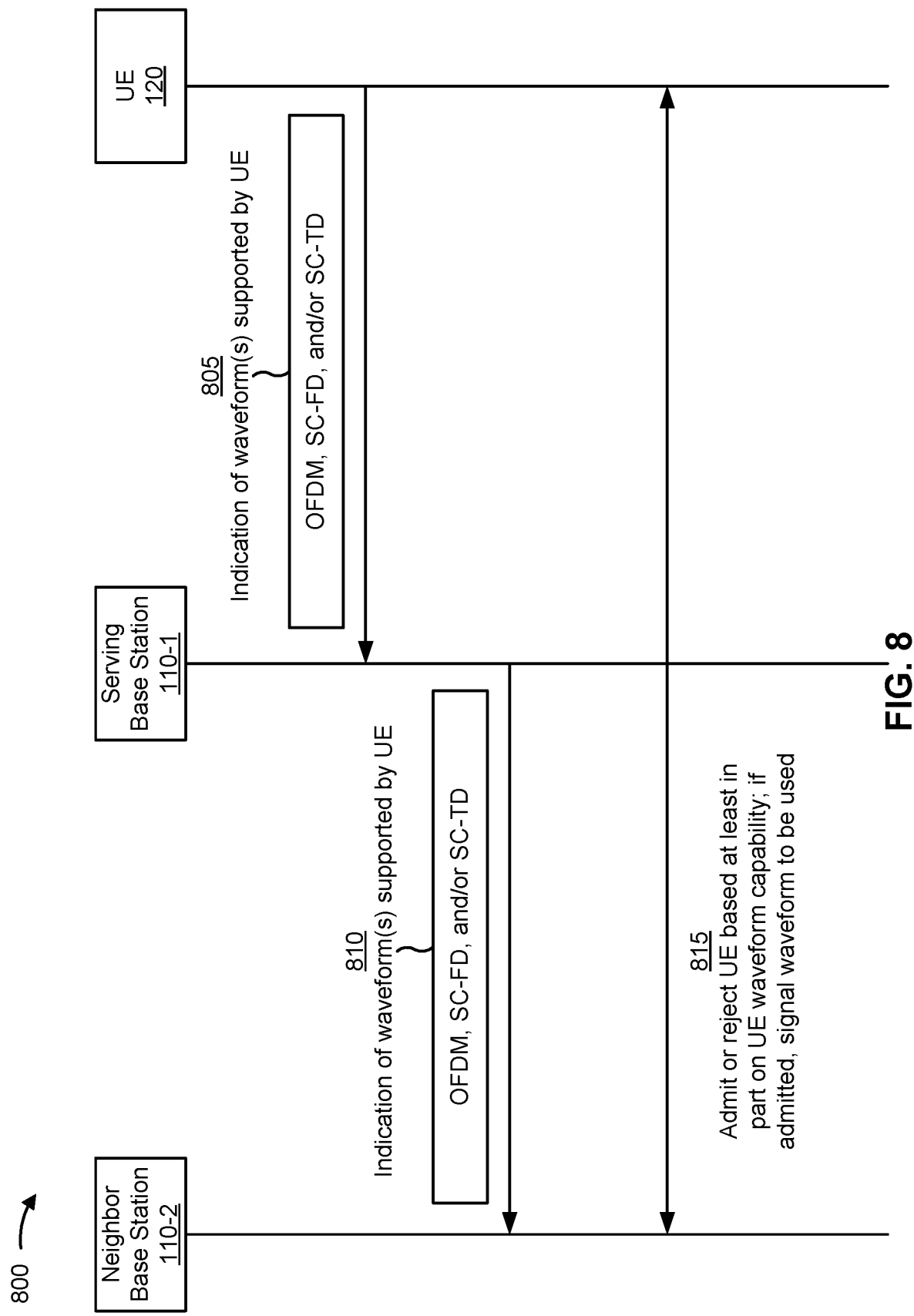

FIG. 8 is a diagram illustrating another example 800 of waveform capability indication, in accordance with various aspects of the present disclosure. As shown in FIG. 8, a serving base station 110-1 and a UE 120 may communicate with one another. In some aspects, the serving base station 110-1 may relay, to a neighbor base station 110-2, a UE waveform capability for the UE 120. In some aspects, the UE waveform capability may be used by the neighbor base station 110-2 to admit or reject the UE 120 for network access.

As shown by reference number 805, the UE 120 may transmit, to the serving base station 110-1, an indication of one or more waveforms supported by the UE 120, in a similar manner as described above in connection with FIG. 7. As shown by reference number 810, the serving base station 110-1 may transmit, to the neighbor base station 110-2, an indication of the one or more waveforms supported by the UE 120. In some aspects, the serving base station 110-1 may indicate the one or more waveforms via a wired interface with the neighbor base station 110-2. Additionally, or alternatively, the serving base station 110-1 may indicate the one or more waveforms via a wireless interface with the neighbor base station 110-2. For example, the serving base station 110-1 may use a signaling message to transmit the indication of the UE waveform capability (e.g., using an explicit indication in a field or an IE in the signaling message), and/or may scramble and/or modify a signal to indicate the UE station waveform capability, in a similar manner as described above in connection with FIG. 5. In some aspects, this technique of indicating a UE waveform capability from a first base station 110 to a second base station 110 may be used when the UE 120 is in an RRC inactive mode.

In some aspects, the indication may be transmitted directly between base stations 110. Alternatively, the indication may be transmitted between base stations 110 via an AMF device (e.g., to one or more base stations 110 within a radio access network (RAN) notification area associated with the AMF device). Additionally, or alternatively, when the UE 120 moves to a new RAN notification area (e.g., in an RRC idle mode) a first AMF device, associated with a prior RAN notification area from which the UE 120 has moved, may indicate the UE waveform capability to a second AMF device associated with a new RAN notification area to which the UE 120 has moved. The second AMF device may transmit a message indicating the UE waveform capability to one or more base stations 110 in the new RAN notification area.

As shown by reference number 815, the neighbor base station 110-2 may admit or reject the UE 120 (e.g., as part of a handover procedure, as part of a cell selection procedure, as part of a network access procedure, in a response to an access request from the UE 120, and/or the like) based at least in part on the UE waveform capability. In some aspects, the neighbor base station 110-2 may admit or reject the UE 120 based at least in part on the UE waveform capability and a neighbor base station waveform capability of the neighbor base station 110-2.

In some aspects, the neighbor base station 110-2 may determine whether to admit or reject the UE 120 based at least in part on whether the neighbor base station 110-2 is capable of communicating with the UE 120. For example, the neighbor base station 110-2 may determine whether the UE 120 and the neighbor base station 110-2 both have a capability to communicate using a same type of waveform, such as by comparing the received UE waveform capability and the neighbor base station waveform capability. In some aspects, if at least one waveform in the UE waveform capability matches a waveform in the neighbor base station waveform capability, then the neighbor base station 110-2 may determine that the UE 120 and the neighbor base station 110-2 are capable of communicating with one another. In this case, the neighbor base station 110-2 may determine at least one waveform, from one or more matching waveforms, to be used for communications, and/or the neighbor base station 110-2 may admit the UE 120. In some aspects, if none of the waveforms that the UE 120 is capable of using matches a waveform supported by the neighbor base station 110-2, then the neighbor base station 110-2 may determine that the UE 120 and the neighbor base station 110-2 are not capable of communicating with one another (e.g., on a wideband BWP). In this case, the neighbor base station 110-2 may reject the UE 120. In this way, network resources and resources of the neighbor base station 110-2 and the UE 120 (e.g., processing resources, memory resources, battery power, and/or the like) may be conserved by preventing a UE 120 from accessing the neighbor base station 110-2 unless the UE 120 and the neighbor base station 110-2 have shared waveform compatibility.

In some aspects, if the neighbor base station 110-2 determines to admit the UE 120, then the neighbor base station 110-2 may indicate a waveform to be used for communications between the UE 120 and the neighbor base station 110-2. For example, in a handover scenario, after being notified of the UE waveform capability by the serving base station 110-1, the neighbor base station 110-2 may indicate, to the serving base station 110-1, a waveform to be used for communications between the neighbor base station 110-2 and the UE 120 (e.g., during and/or after handover). In some aspects, the neighbor base station 110-2 may determine the waveform based at least in part on the UE waveform capability and the neighbor base station waveform capability (e.g., to determine a compatible waveform, a compatible waveform with the best performance as compared to other compatible waveforms, and/or the like). In some aspects, the neighbor base station 110-2 may indicate the waveform to the serving base station 110-1 in an acknowledgement (ACK) message in response to receiving the UE waveform capability from the serving base station 110-1. The serving base station 110-1 may relay the waveform, selected and indicated by the neighbor base station 110-2, to the UE 120. The UE 120 may then use this waveform to communicate with the neighbor base station 110-2 (e.g., during and/or after handover). In this way, resources may be conserved that would otherwise be wasted by attempting communications using incompatible waveforms and/or a sub-optimal waveform.

As indicated above, FIG. 8 is provided as an example. Other examples may differ from what is described with respect to FIG. 8.

Figure 9:
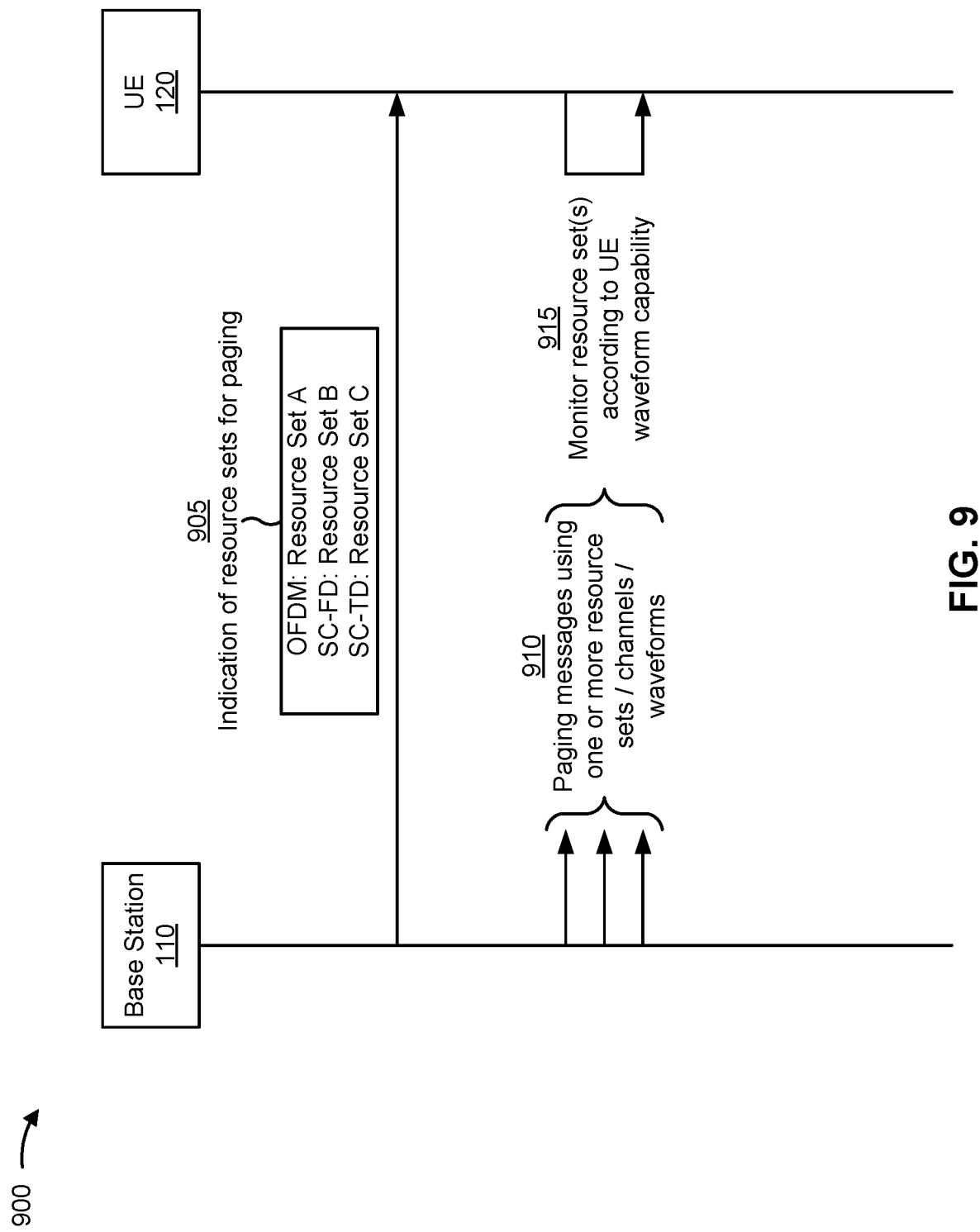

FIG. 9 is a diagram illustrating another example 900 of waveform capability indication, in accordance with various aspects of the present disclosure. As shown in FIG. 9, a base station 110 and a UE 120 may communicate with one another. In some aspects, the base station 110 is a serving base station that serves the UE 120.

As shown by reference number 905, the base station 110 may transmit, and the UE 120 may receive, a configuration that indicates a first set of resources (e.g., time, frequency, and/or spatial resources) to be used for paging messages transmitted using a first waveform (e.g., an OFDM waveform) and a second set of resources to be used for paging messages transmitted using a second waveform (e.g., an SC waveform, such as an SC-FD waveform and/or an SC-TD waveform). Additionally, or alternatively, the base station 110 may indicate a first set of resources to be used for paging messages transmitted using the OFDM waveform, a second set of resources to be used for paging messages transmitted using the SC-TD waveform, and a third set of resources to be used for paging messages transmitted using the SC-FD waveform. In this case, the UE 120 may use the indication to determine a set of resources to be monitored by the UE 120 for paging messages transmitted using a waveform supported by the UE 120 (and/or a waveform selected by the UE 120 in the case of multiple matching waveforms), and may monitor for and/or receive paging messages using the set of resources for that waveform.

As shown by reference number 910, the base station 110 may transmit a paging message on one or more sets of resources according to the sets of resources indicated to the UE 120 in the configuration described above. In some aspects, the base station 110 may determine which sets of resources to use to transmit the paging message based at least in part on whether the base station 110 has received an indication of one or more waveforms supported by the UE 120. For example, if the base station 110 has received a UE waveform capability of the UE 120, then the base station 110 may transmit the paging message on only the set(s) of resources corresponding to the waveform(s) supported by the UE 120. Alternatively, if the base station 110 has not received a UE waveform capability of the UE 120, then the base station 110 may transmit the paging message on all sets of resources (e.g., corresponding to all waveforms). In some aspects, if the paging message is an emergency message (e.g., a public warning system (PWS) message, a wireless emergency alert (WEA) message, a commercial mobile alert system (CMAS) message, an earthquake and tsunami warning system (ETWS) message, a presidential level alert message, and/or the like) and/or a message indicating a change in system information, then the base station 110 may transmit the paging message on all sets of resources (e.g., corresponding to all waveforms) to reduce the likelihood that such a message is missed.

In some aspects, different sets of resources, corresponding to different waveforms, may be associated with different channels. For example, a first set of resources (e.g., for an OFDM waveform) may be associated with a first channel (e.g., a control channel, such as a physical downlink control channel (PDCCH)), and a second set of resources (e.g., for an SC waveform, such as an SC-TD waveform or an SC-FD waveform) may be associated with a second channel (e.g., a data channel, such as a physical downlink shared channel (PDSCH)). Additionally, or alternatively, different sets of resources may be configured on the second channel (e.g., the data channel) for different waveforms. For example, a set of resources on the data channel may be configured for paging messages using the SC-TD waveform, and another set of resources on the data channel may be configured for paging messages using the SC-FD waveform.

As shown by reference number 915, the UE 120 may monitor one or more of the indicated sets of resources based at least in part on the UE waveform capability. For example, the UE 120 may monitor only the sets of resources that correspond to a waveform supported by the UE 120. In some aspects, if the UE 120 is capable of communicating using multiple waveforms, the UE 120 may select one of the multiple waveforms, and may monitor for paging messages on only the set of resources corresponding to the selected waveform (e.g., to conserve resources of the UE 120). Alternatively, if the UE 120 is capable of communicating using multiple waveforms, the UE 120 may monitor for paging messages on multiple sets of resources corresponding to the multiple waveforms (e.g., to increase a likelihood of successfully receiving a paging message).

As indicated above, FIG. 9 is provided as an example. Other examples may differ from what is described with respect to FIG. 9.

Figure 10:
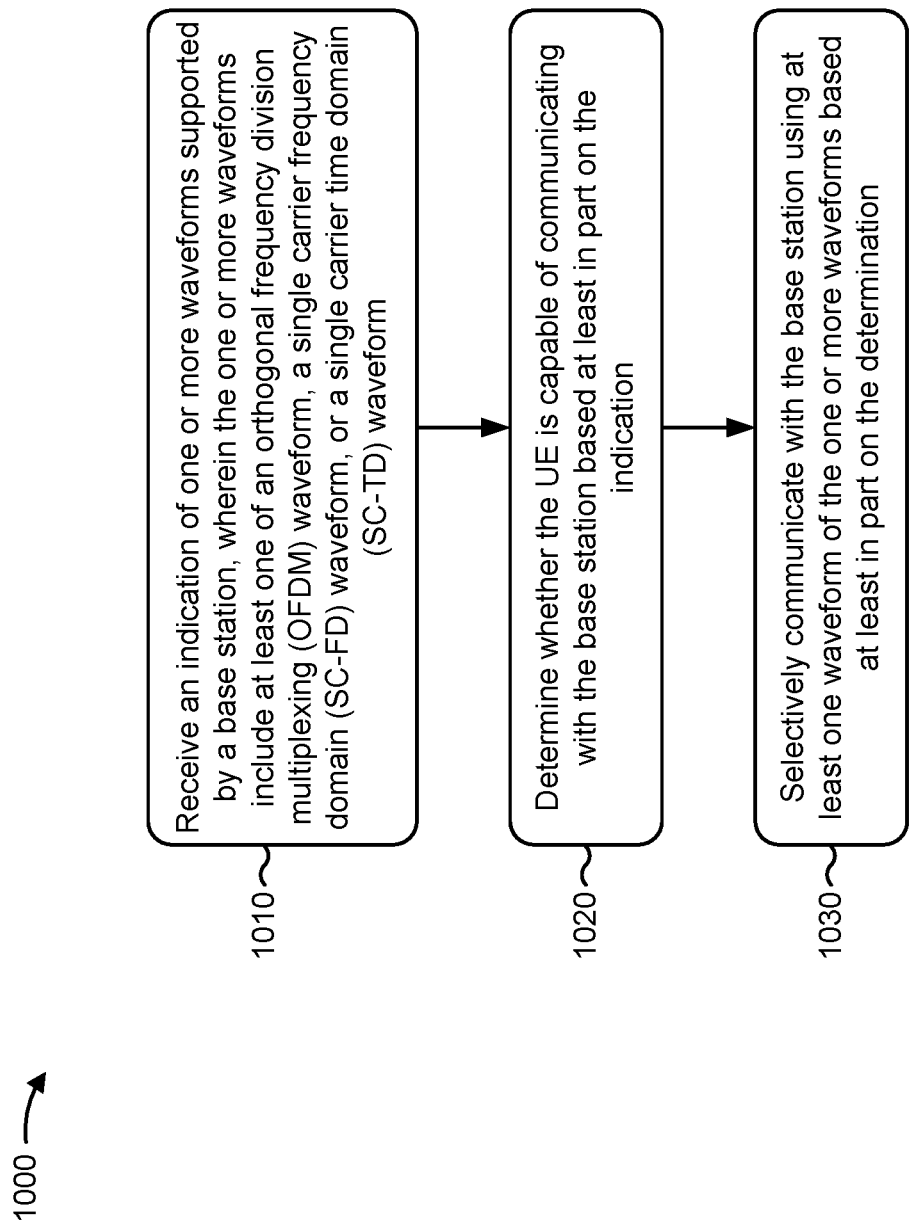
FIG. 10 is a diagram illustrating an example process performed, for example, by a user equipment, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120 and/or the like) performs operations associated with waveform capability indication.

As shown in FIG. 10, in some aspects, process 1000 may include receiving an indication of one or more waveforms supported by a base station, wherein the one or more waveforms include at least one of an orthogonal frequency division multiplexing (OFDM) waveform, a single carrier frequency domain (SC-FD) waveform, or a single carrier time domain (SC-TD) waveform (block 1010). For example, the UE (e.g., using receive processor 258, controller/processor 280, memory 282, and/or the like) may receive an indication of one or more waveforms supported by a base station, as described above. In some aspects, the one or more waveforms include at least one of an OFDM waveform, an SC-FD waveform, or an SC-TD waveform.

As further shown in FIG. 10, in some aspects, process 1000 may include determining whether the UE is capable of communicating with the base station based at least in part on the indication (block 1020). For example, the UE (e.g., using controller/processor 280, memory 282, and/or the like) may determine whether the UE is capable of communicating with the base station based at least in part on the indication, as described above.

As further shown in FIG. 10, in some aspects, process 1000 may include selectively communicating with the base station using at least one waveform of the one or more waveforms based at least in part on the determination (block 1030). For example, the UE (e.g., using receive processor 258, transmit processor 264, controller/processor 280, memory 282, and/or the like) may selectively communicate with the base station using at least one waveform of the one or more waveforms based at least in part on the determination, as described above.

Process 1000 may include additional aspects, such as any single aspect or any combination of aspects described below and/or in connection with one or more other processes described elsewhere herein.

In a first aspect, the indication further indicates whether the one or more waveforms are supported for transmission, for reception, or for both transmission and reception.

In a second aspect, alone or in combination with the first aspect, the indication is received in at least one of a physical broadcast channel communication, remaining minimum system information, other system information, a radio resource control message, a medium access control (MAC) control element, downlink control information, or a combination thereof.

In a third aspect, alone or in combination with one or more of the first and second aspects, the indication is received via a signal that is scrambled or modified to indicate the one or more waveforms.

In a fourth aspect, alone or in combination with one or more of the first through third aspects, the signal includes at least one of a primary synchronization signal, a secondary synchronization signal, a physical broadcast channel demodulation reference signal, a physical broadcast channel cyclic redundancy check, a reference signal in a synchronization signal block, or a combination thereof.

In a fifth aspect, alone or in combination with one or more of the first through fourth aspects, process 1000 includes monitoring for at least one of a first set of synchronization signal blocks transmitted using the OFDM waveform or a second set of synchronization signal blocks transmitted using at least one of the SC-FD waveform or the SC-TD waveform.

In a sixth aspect, alone or in combination with one or more of the first through fifth aspects, process 1000 includes monitoring for at least one of first remaining minimum system information transmitted using the OFDM waveform or second remaining minimum system information transmitted using at least one of the SC-FD waveform or the SC-TD waveform.

In a seventh aspect, alone or in combination with one or more of the first through sixth aspects, a PBCH payload indicates a location of at least one of a synchronization signal block or remaining minimum system information transmitted using a second waveform of the OFDM waveform or the at least one of the SC-FD waveform or the SC-TD waveform.

In an eighth aspect, alone or in combination with one or more of the first through seventh aspects, process 1000 includes receiving remaining minimum system information that indicates a first set of random access channel (RACH) resources for the OFDM waveform and a second set of RACH resources for at least one of the SC-FD waveform or the SC-TD waveform.

In a ninth aspect, alone or in combination with one or more of the first through eighth aspects, the one or more waveforms supported by the UE include at least one of the OFDM waveform, the SC-FD waveform, or the SC-TD waveform.

In a tenth aspect, alone or in combination with one or more of the first through ninth aspects, the one or more waveforms supported by the UE are indicated using at least one of: a UE capability information message associated with initial network registration, a UE capability report associated with a radio resource control procedure, a random access procedure (RACH) message, or a combination thereof.

In an eleventh aspect, alone or in combination with one or more of the first through tenth aspects, the one or more waveforms supported by the UE are indicated using the RACH message based at least in part on a set of resources used by the UE to transmit the RACH message, wherein a first set of resources for the RACH message indicates the OFDM waveform and a second set of resources for the RACH message indicates at least one of the SC-FD waveform or the SC-TD waveform.

In a twelfth aspect, alone or in combination with one or more of the first through eleventh aspects, process 1000 includes receiving a configuration that indicates a first set of resources to be used for paging messages transmitted using the OFDM waveform and a second set of resources to be used for paging messages transmitted using at least one of the SC-FD waveform or the SC-TD waveform.

In a thirteenth aspect, alone or in combination with one or more of the first through twelfth aspects, process 1000 includes monitoring at least one of the first set of resources or the second set of resources based at least in part on one or more waveforms supported by the UE.

In a fourteenth aspect, alone or in combination with one or more of the first through thirteenth aspects, the first set of resources are associated with a first channel and the second set of resources are associated with a second channel.

In a fifteenth aspect, alone or in combination with one or more of the first through fourteenth aspects, the first channel is a control channel and the second channel is a data channel.

In a sixteenth aspect, alone or in combination with one or more of the first through fifteenth aspects, the base station is a serving base station that serves the UE.

In a seventeenth aspect, alone or in combination with one or more of the first through sixteenth aspects, the base station is a neighbor base station.

In an eighteenth aspect, alone or in combination with one or more of the first through seventeenth aspects, process 1000 includes selecting the neighbor base station for handover based at least in part on the one or more waveforms supported by the neighbor base station.

In a nineteenth aspect, alone or in combination with one or more of the first through eighteenth aspects, the one or more waveforms are beam-specific, and the UE is configured to reset at least one of a media access control buffer or a radio link control buffer when the UE switches from a first beam to a second beam.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
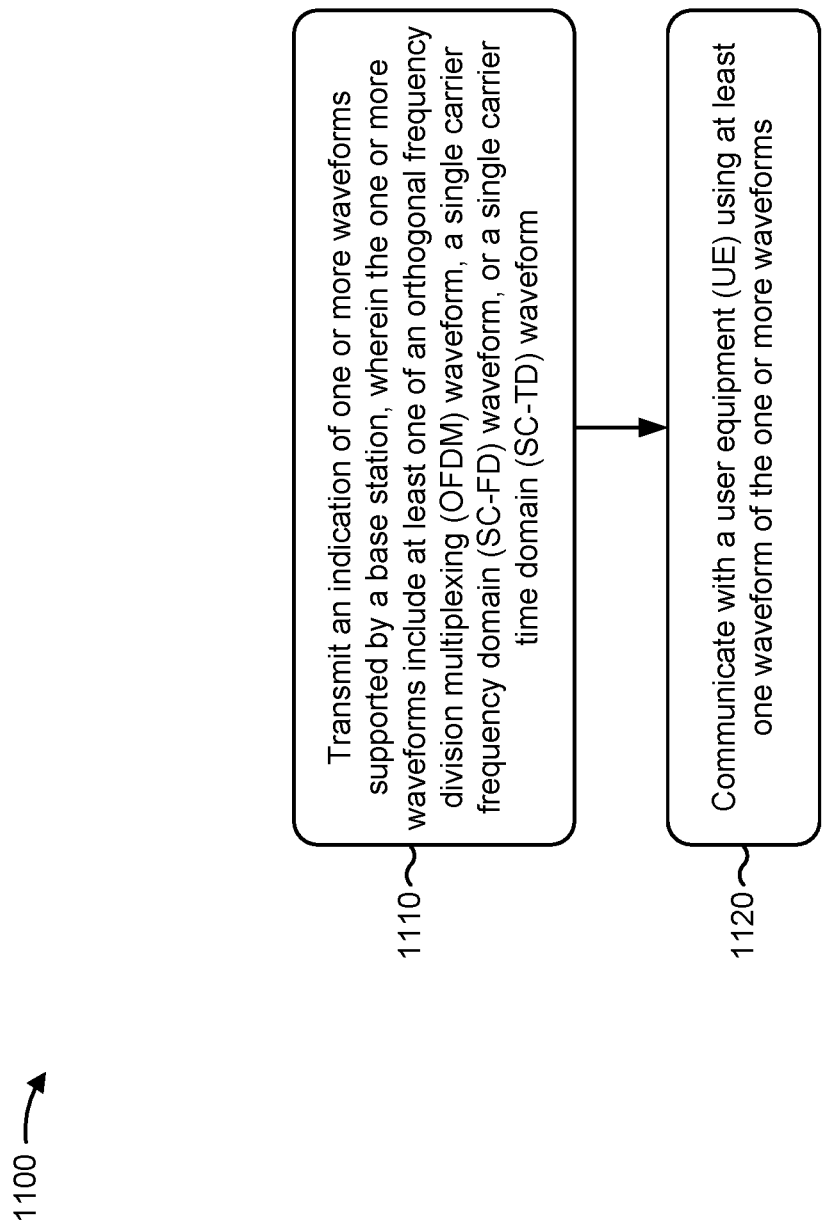
FIG. 11 is a diagram illustrating an example process performed, for example, by a base station, in accordance with various aspects of the present disclosure.

FIG. 11 is a diagram illustrating an example process 1100 performed, for example, by a base station, in accordance with various aspects of the present disclosure. Example process 1100 is an example where a base station (e.g., base station 110 and/or the like) performs operations associated with waveform capability indication.

As shown in FIG. 11, in some aspects, process 1100 may include transmitting an indication of one or more waveforms supported by the base station, wherein the one or more waveforms include at least one of an OFDM waveform, an SC-FD waveform, or an SC-TD waveform (block 1110). For example, the base station (e.g., using transmit processor 220, controller/processor 240, memory 242, and/or the like) may transmit an indication of one or more waveforms supported by the base station, as described above. In some aspects, the one or more waveforms include at least one of an OFDM waveform, an SC-FD waveform, or an SC-TD waveform.

As further shown in FIG. 11, in some aspects, process 1100 may include communicating with a UE using at least one waveform of the one or more waveforms (block 1120). For example, the base station (e.g., using transmit processor 220, receive processor 238, controller/processor 240, memory 242, and/or the like) may communicate with a UE using at least one waveform of the one or more waveforms, as described above.

Process 1100 may include additional aspects, such as any single aspect or any combination of aspects described below and/or in connection with one or more other processes described elsewhere herein.

In a first aspect, the indication is transmitted in at least one of a physical broadcast channel communication, remaining minimum system information, other system information, a radio resource control message, a medium access control (MAC) control element, downlink control information, or a combination thereof.

In a second aspect, alone or in combination with the first aspect, the indication is transmitted using a signal that is scrambled or modified to indicate the one or more waveforms.

In a third aspect, alone or in combination with one or more of the first and second aspects, the signal includes at least one of a primary synchronization signal, a secondary synchronization signal, a physical broadcast channel demodulation reference signal, a physical broadcast channel cyclic redundancy check, a reference signal in a synchronization signal block, or a combination thereof.

In a fourth aspect, alone or in combination with one or more of the first through third aspects, process 1100 includes transmitting a first set of synchronization signal blocks using the OFDM waveform and a second set of synchronization signal blocks using at least one of the SC-FD waveform or the SC-TD waveform.

In a fifth aspect, alone or in combination with one or more of the first through fourth aspects, process 1100 includes transmitting first remaining minimum system information using the OFDM waveform and second remaining minimum system information using at least one of the SC-FD waveform or the SC-TD waveform.

In a sixth aspect, alone or in combination with one or more of the first through fifth aspects, the PBCH payload indicates a location of at least one of a synchronization signal block or remaining minimum system information that is transmitted using a second waveform of the OFDM waveform or the at least one of the SC-FD waveform or the SC-TD waveform.

In a seventh aspect, alone or in combination with one or more of the first through sixth aspects, process 1100 includes transmitting remaining minimum system information that indicates a first set of random access channel (RACH) resources for the OFDM waveform and a second set of RACH resources for at least one of the SC-FD waveform or the SC-TD waveform.

In an eighth aspect, alone or in combination with one or more of the first through seventh aspects, the one or more waveforms supported by the UE include at least one of the OFDM waveform, the SC-FD waveform, or the SC-TD waveform.

In a ninth aspect, alone or in combination with one or more of the first through eighth aspects, the one or more waveforms supported by the UE are indicated using at least one of: a UE capability information message associated with initial network registration, a UE capability report associated with a radio resource control procedure, a RACH message, a message received from another base station, a message received from an access and mobility function device, or a combination thereof.

In a tenth aspect, alone or in combination with one or more of the first through ninth aspects, the one or more waveforms supported by the UE are indicated using the RACH message based at least in part on a set of resources used by the UE to transmit the RACH message, wherein a first set of resources for the RACH message indicates the OFDM waveform and a second set of resources for the RACH message indicates at least one of the SC-FD waveform or the SC-TD waveform.

In an eleventh aspect, alone or in combination with one or more of the first through tenth aspects, process 1100 includes transmitting an indication of the one or more waveforms supported by the UE to a neighbor base station.

In a twelfth aspect, alone or in combination with one or more of the first through eleventh aspects, the one or more waveforms supported by the UE are used by the neighbor base station for admission or rejection of access for the UE.

In a thirteenth aspect, alone or in combination with one or more of the first through twelfth aspects, process 1100 includes transmitting a configuration that indicates a first set of resources to be used for paging messages transmitted using the OFDM waveform and a second set of resources to be used for paging messages transmitted using at least one of the SC-FD waveform or the SC-TD waveform.

In a fourteenth aspect, alone or in combination with one or more of the first through thirteenth aspects, process 1100 includes transmitting a paging message on the first set of resources, the second set of resources, or both the first set of resources and the second set of resources based at least in part on whether the base station has received an indication of one or more waveforms supported by the UE.

In a fifteenth aspect, alone or in combination with one or more of the first through fourteenth aspects, a paging message is transmitted on both the first set of resources or the second set of resources based at least in part on a determination that the paging message is an emergency message or a message that indicates a change in system information.

In a sixteenth aspect, alone or in combination with one or more of the first through fifteenth aspects, the first set of resources are associated with a first channel and the second set of resources are associated with a second channel.

In a seventeenth aspect, alone or in combination with one or more of the first through sixteenth aspects, the first channel is a control channel and the second channel is a data channel.

In an eighteenth aspect, alone or in combination with one or more of the first through seventeenth aspects, process 1100 includes receiving an indication of one or more waveforms supported by a neighbor base station; and transmitting, to the UE, an indication of the one or more waveforms supported by the neighbor base station.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
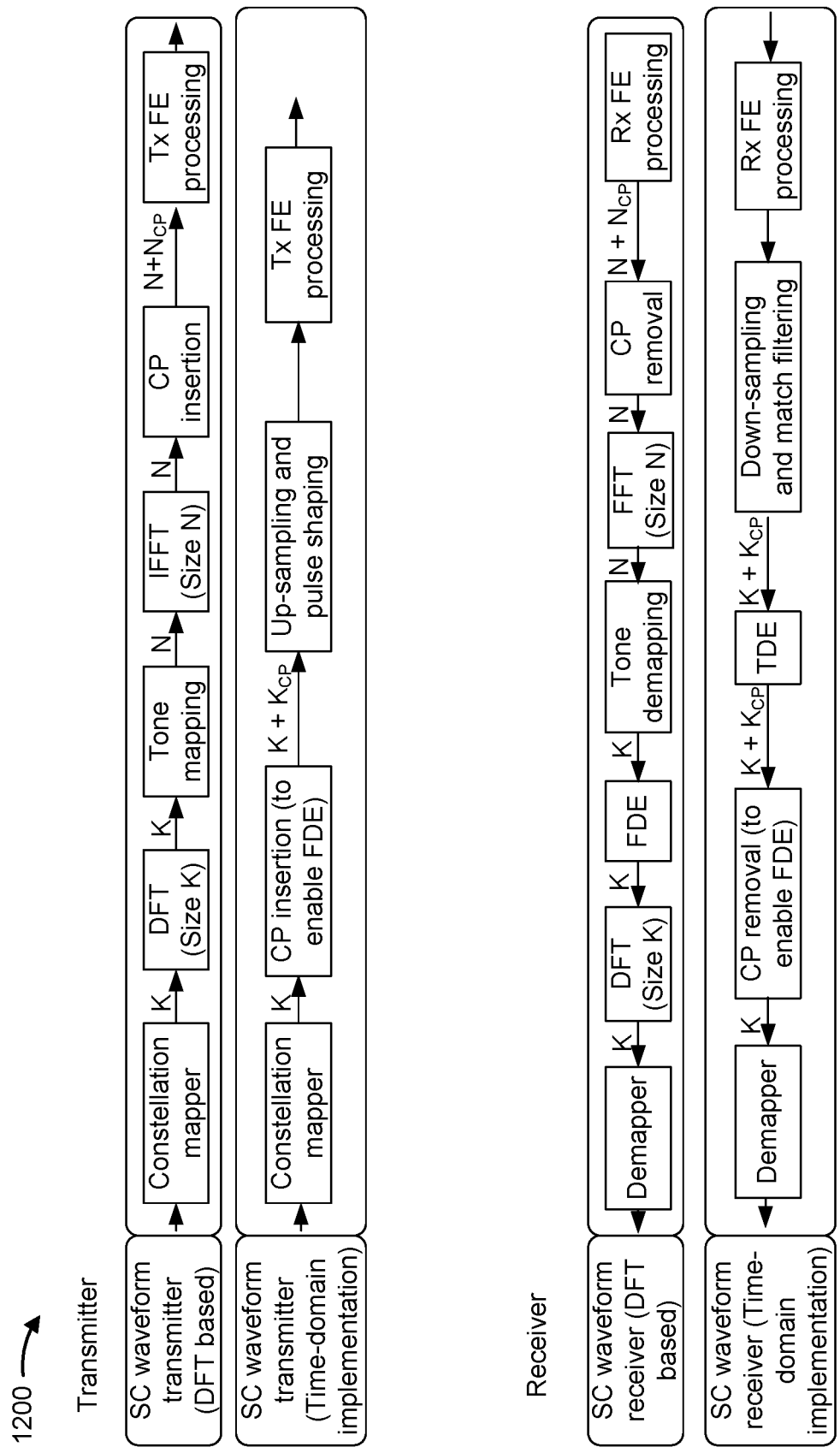
FIG. 12 is a diagram illustrating an example of a transmitter architecture and a receiver architecture for transmitting or receiving different waveforms, in accordance with various aspects of the present disclosure.

FIG. 12 is a diagram illustrating an example of a transmitter architecture and a receiver architecture for transmitting or receiving different waveforms, in accordance with various aspects of the present disclosure.

As shown in FIG. 12, an SC waveform transmitter capable of transmitting an SC-FD waveform (e.g., a DFT-based waveform) may include a constellation mapping component, a DFT (of size K) component, a tone mapping component, an FFT (of size N) component, a cyclic prefix insertion component, and a frequency equalization (FE) processing component (e.g., a Tx FE processing component).

As further shown, an SC waveform transmitter capable of transmitting an SC-TD waveform may include a constellation mapping component, a cyclic prefix insertion component (e.g., to enable frequency domain equalization (FDE)), an up-sampling and pulse shaping component, and an FE processing component (e.g., a Tx FE processing component). Notably, a DFT (of size K) component, a tone mapping component, and an FFT (of size N) component may not be used to generate SC-TD waveforms.

As further shown, an SC waveform receiver capable of receiving an SC-FD waveform (e.g., a DFT-based waveform) may include an FE processing component (e.g., an Rx FE processing component), a cyclic prefix removal component, an FFT (of size N) component, a tone demapping component, an FDE component, a DFT (of size K) component, and a constellation demapping component.

As further shown, an SC waveform receiver capable of receiving an SC-TD waveform may include an FE processing component (e.g., an Rx FE processing component), a down-sampling and match filtering component, a time domain equalization (TDE) component, a cyclic prefix removal component (e.g., to enable FDE), and a constellation demapping component. Notably, a DFT (of size K) component, a tone demapping component, and an FFT (of size N) component may not be used to receive SC-TD waveforms.

As indicated above, FIG. 12 is provided as an example. Other examples may differ from what is described with respect to FIG. 12.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

receiving an indication of a waveform capability of a network entity indicative of one or more waveforms supported by the network entity, wherein the one or more waveforms include at least one of an orthogonal frequency division multiplexing (OFDM) waveform, a single carrier frequency domain (SC-FD) waveform, or a single carrier time domain (SC-TD) waveform, and wherein the indication further indicates whether the one or more waveforms are supported for both transmission and reception;

comparing a waveform capability of the UE to the waveform capability of the network entity to determine whether the UE and the network entity have a capability to communicate using at least one waveform of the one or more waveforms;

selectively communicating with the network entity using the at least one waveform of the one or more waveforms based at least in part on the comparing; and receiving a physical broadcast channel (PBCH) payload transmitted using a first waveform of the OFDM waveform or at least one of the SC-FD waveform or the SC-TD waveform, wherein the PBCH payload indicates a location of at least one of a synchronization signal block or remaining minimum system information transmitted using a second waveform of the OFDM waveform or the at least one of the SC-FD waveform or the SC-TD waveform.

2. The method of claim 1, wherein the indication is received in at least one of a PBCH communication, the remaining minimum system information, other system information, a radio resource control message, a medium access control (MAC) control element, downlink control information, or a combination thereof.

3. The method of claim 1, wherein the indication is received via a signal that is scrambled to indicate the one or more waveforms.

4. The method of claim 3, wherein the signal includes at least one of a primary synchronization signal, a secondary synchronization signal, a PBCH demodulation reference signal, a PBCH cyclic redundancy check, a reference signal in the synchronization signal block, or a combination thereof.

5. The method of claim 1, further comprising monitoring for at least one of a first set of synchronization signal blocks transmitted using the OFDM waveform or a second set of synchronization signal blocks transmitted using at least one of the SC-FD waveform or the SC-TD waveform.

6. The method of claim 1, further comprising monitoring for at least one of first remaining minimum system information transmitted using the OFDM waveform or second remaining minimum system information transmitted using at least one of the SC-FD waveform or the SC-TD waveform.

7. The method of claim 1, further comprising receiving remaining minimum system information that indicates a first set of random access channel (RACH) resources for the OFDM waveform and a second set of RACH resources for at least one of the SC-FD waveform or the SC-TD waveform.

8. The method of claim 1, further comprising transmitting an indication of one or more waveforms supported by the UE, wherein the one or more waveforms supported by the UE include at least one of the OFDM waveform, the SC-FD waveform, or the SC-TD waveform.

9. The method of claim 8, wherein the one or more waveforms supported by the UE are indicated using at least one of:

a UE capability information message associated with initial network registration,
a UE capability report associated with a radio resource control procedure,
a random access procedure (RACH) message, or
a combination thereof.

10. The method of claim 9, wherein the one or more waveforms supported by the UE are indicated using the RACH message based at least in part on a set of resources used by the UE to transmit the RACH message, wherein a first set of resources for the RACH message indicates the OFDM waveform and a second set of resources for the RACH message indicates at least one of the SC-FD waveform or the SC-TD waveform.

11. The method of claim 1, further comprising receiving a configuration that indicates a first set of resources to be used for paging messages transmitted using the OFDM waveform and a second set of resources to be used for paging messages transmitted using at least one of the SC-FD waveform or the SC-TD waveform.

12. The method of claim 11, further comprising monitoring at least one of the first set of resources or the second set of resources based at least in part on one or more waveforms supported by the UE.

13. The method of claim 11, wherein the first set of resources are associated with a first channel and the second set of resources are associated with a second channel.

14. The method of claim 13, wherein the first channel is a control channel and the second channel is a data channel.

15. The method of claim 1, wherein the network entity is one of a serving base station, that serves the UE, or a neighbor base station.

16. The method of claim 15, further comprising selecting the neighbor base station for handover based at least in part on the one or more waveforms being supported by the neighbor base station.

17. The method of claim 1, wherein the one or more waveforms are beam-specific, and wherein the UE is configured to reset at least one of a media access control buffer or a radio link control buffer when the UE switches from a first beam to a second beam.

18. The method of claim 1, wherein receiving the indication of the waveform capability comprises:
receiving, from the network entity, a message including the indication, wherein the message dictates one or more types of communications or network procedures for which the one or more waveforms are supported.

19. A method of wireless communication performed by a network entity, comprising:
transmitting an indication of a waveform capability of the network entity indicative of one or more waveforms supported by the network entity, wherein the one or more waveforms include at least one of an orthogonal frequency division multiplexing (OFDM) waveform, a single carrier frequency domain (SC-FD) waveform, or a single carrier time domain (SC-TD) waveform, and wherein the indication further indicates whether the one or more waveforms are supported for both transmission and reception;
comparing a waveform capability of a user equipment (UE) to the waveform capability of the network entity to determine whether the UE and the network entity have a capability to communicate using at least one waveform of the one or more waveforms;
communicating with the UE using the at least one waveform of the one or more waveforms based at least in part on the comparing; and
transmitting a physical broadcast channel (PBCH) payload using a first waveform of the OFDM waveform or at least one of the SC-FD waveform or the SC-TD waveform, wherein the PBCH payload indicates a location of at least one of a synchronization signal block or remaining minimum system information transmitted using a second waveform of the OFDM waveform or the at least one of the SC-FD waveform or the SC-TD waveform.

20. The method of claim 19, wherein the indication is transmitted in at least one of a PBCH communication, the remaining minimum system information, other system information, a radio resource control message, a medium access control (MAC) control element, downlink control information, a signal that is scrambled or modified to indicate the one or more waveforms, or a combination thereof.

21. The method of claim 19, further comprising transmitting a first set of synchronization signal blocks using the OFDM waveform and a second set of synchronization signal blocks using at least one of the SC-FD waveform or the SC-TD waveform.

22. The method of claim 19, further comprising transmitting first remaining minimum system information using the OFDM waveform and second remaining minimum system information using at least one of the SC-FD waveform or the SC-TD waveform.

23. The method of claim 19, further comprising transmitting remaining minimum system information that indicates a first set of random access channel (RACH) resources for the OFDM waveform and a second set of RACH resources for at least one of the SC-FD waveform or the SC-TD waveform.

24. The method of claim 19, further comprising receiving an indication of one or more waveforms supported by the UE, wherein the one or more waveforms supported by the UE include at least one of the OFDM waveform, the SC-FD waveform, or the SC-TD waveform.

25. The method of claim 19, further comprising transmitting a configuration that indicates a first set of resources to be used for paging messages transmitted using the OFDM waveform and a second set of resources to be used for paging messages transmitted using at least one of the SC-FD waveform or the SC-TD waveform.

26. The method of claim 19, further comprising receiving an indication of one or more waveforms supported by a neighbor base station; and
transmitting, to the UE, the indication of the one or more waveforms supported by the neighbor base station.

27. A user equipment (UE) for wireless communication, comprising:
one or more memories; and
one or more processors, coupled to the one or more memories, configured to cause the UE to:
receive an indication of a waveform capability of a network entity indicative of one or more waveforms supported by the network entity, wherein the one or more waveforms include at least one of an orthogonal frequency division multiplexing (OFDM) waveform, a single carrier frequency domain (SC-FD) waveform, or a single carrier time domain (SC-TD) waveform, and wherein the indication further indicates whether the one or more waveforms are supported for both transmission and reception;
compare a waveform capability of the UE to the waveform capability of the network entity to determine whether the UE and the network entity have a capability to communicate using at least one waveform of the one or more waveforms;

selectively communicate with the network entity using the at least one waveform of the one or more waveforms based at least in part on the comparing; and receive a physical broadcast channel (PBCH) payload transmitted using a first waveform of the OFDM waveform or at least one of the SC-FD waveform or the SC-TD waveform, wherein the PBCH payload indicates a location of at least one of a synchronization signal block or remaining minimum system information transmitted using a second waveform of the OFDM waveform or the at least one of the SC-FD waveform or the SC-TD waveform.

28. A network entity for wireless communication, comprising:

one or more memories; and one or more processors, coupled to the one or more memories, configured to cause the network entity to:

transmit an indication of a waveform capability of the network entity indicative of one or more waveforms supported by the network entity, wherein the one or more waveforms include at least one of an orthogonal frequency division multiplexing (OFDM) waveform, a single carrier frequency domain (SC-FD) waveform, or a single carrier time domain (SC-TD) waveform, and wherein the indication further indicates whether the one or more waveforms are supported for both transmission and reception;

compare a waveform capability of a user equipment (UE) to the waveform capability of the network entity to determine whether the UE and the network entity have a capability to communicate using at least one waveform of the one or more waveforms;

communicate with the UE using the at least one waveform of the one or more waveforms based at least in part on the comparing; and transmit a physical broadcast channel (PBCH) payload using a first waveform of the OFDM waveform or at least one of the SC-FD waveform or the SC-TD waveform, wherein the PBCH payload indicates a location of at least one of a synchronization signal block or remaining minimum system information transmitted using a second waveform of the OFDM waveform or the at least one of the SC-FD waveform or the SC-TD waveform.

29. The UE of claim 27, wherein the one or more processors, to receive the indication, are configured to:

receive the indication in at least one of a PBCH communication, the remaining minimum system information, other system information, a radio resource control message, a medium access control (MAC) control element, downlink control information, or a combination thereof.

30. The UE of claim 27, wherein the one or more processors, to receive the indication, are configured to:

receive the indication via a signal that is scrambled to indicate the one or more waveforms.

* * * * *